(12) United States Patent
Menezes et al.

(10) Patent No.: US 12,236,380 B2
(45) Date of Patent: Feb. 25, 2025

(54) RISK BASED LIFECYCLE MANAGEMENT SYSTEMS

(71) Applicant: ValGenesis, Inc., Santa Clara, CA (US)

(72) Inventors: José M. C. Menezes, Branca—CCH (PT); Sivakumar Muthusamy, Fremont, CA (US)

(73) Assignee: VALGENESIS, INC., Santa Clara, CA (US)

( * ) Notice: Subject to any disclaimer, the term of this patent is extended or adjusted under 35 U.S.C. 154(b) by 0 days.

(21) Appl. No.: 18/192,616

(22) Filed: Mar. 29, 2023

(65) Prior Publication Data
US 2024/0211838 A1     Jun. 27, 2024

Related U.S. Application Data

(63) Continuation of application No. 18/146,887, filed on Dec. 27, 2022, now abandoned.

(51) Int. Cl.
*G06Q 10/0635*    (2023.01)

(52) U.S. Cl.
CPC ................. *G06Q 10/0635* (2013.01)

(58) Field of Classification Search
CPC .................................. G06Q 10/0635
USPC ....................................... 705/7.28
See application file for complete search history.

(56) References Cited

U.S. PATENT DOCUMENTS

| | | | |
|---|---|---|---|
| 10,713,411 B1 * | 7/2020 | Chang | G03F 1/36 |
| 2004/0117126 A1 * | 6/2004 | Fetterman | G16H 70/40 |
| | | | 702/19 |
| 2006/0122873 A1 | 6/2006 | Minotto | |
| 2009/0143892 A1 * | 6/2009 | Popp | G06Q 10/06 |
| | | | 700/110 |
| 2018/0075379 A1 * | 3/2018 | Menezes | G06Q 10/0635 |
| 2021/0048741 A1 * | 2/2021 | Lugg | G06N 20/00 |

(Continued)

OTHER PUBLICATIONS

"Failure Modes and Effects Analysis (FMEA)Tool" Institute for Healthcare Improvement. [https://www.ihi.org/resources/Pages/Tools/FailureModesandEffectsAnalysisTool.aspx] retrieved Oct. 12, 2022, 3 pages.

(Continued)

*Primary Examiner* — Abdallah A El-Hage Hassan
(74) *Attorney, Agent, or Firm* — Amin, Turocy & Watson, LLP

(57) ABSTRACT

Risk based lifecycle management systems are presented herein. A system determines a process ontology of a process including process steps of the process and objects including attributes corresponding to performances of the process steps; associates a process step with respective objects using a tracing matrix; detects an event corresponding to a performance of the process step; and associates the event with the process step and the respective objects using the tracing matrix. In response to determining, utilizing a machine learning model, that the event corresponds to a defined risk profile including defined failure modes, the system selects a group of defined failure modes as candidates of causality of the event representing potential multi-variant causes of the event, and sends the candidates of causality of the event directed to a user identity to facilitate mitigation of effects of the potential multi-variant causes of the event on the process.

20 Claims, 18 Drawing Sheets

(56) References Cited

U.S. PATENT DOCUMENTS

2021/0171221 A1* 6/2021 Wilmering .......... G06F 11/0784
2023/0119186 A1* 4/2023 O'Donoghue .......... G06N 3/08
706/21

OTHER PUBLICATIONS

"Risk Priority Number (from Failure Modesand Effects Analysis)" Institute for Healthcare Improvement. [https://www.ihi.org/resources/Pages/Measures/RiskPriorityNumberfromFailureModesandEffects Analysis.aspx#:~:text=Formula%3A] retrieved Oct. 12, 2022, 2 pages.

European Search Report dated Jan. 4, 2024 for European Patent Application No. 23190201.6, 11 pages.

* cited by examiner

RISK BASED LIFECYCLE MANAGEMENT SYSTEMS

RELATED APPLICATION

The subject patent application is a continuation of, and claims priority to, U.S. patent application Ser. No. 18/146,887, filed Dec. 27, 2022, and entitled "RISK BASED LIFECYCLE MANAGEMENT SYSTEMS," the entirety of which priority application is hereby incorporated by reference herein.

TECHNICAL FIELD

The subject disclosure generally relates to embodiments for risk based lifecycle management systems.

BACKGROUND

Conventional risk management technologies utilize failure mode and effects analysis (FMEA) to identify possible failures in manufacturing and/or product development environments. During FMEA, a risk priority number (RPN) is used to represent a risk priority level of a failure mode, or cause of failure.

One disadvantage of conventional risk management technologies is that identified RPNs may not reflect an actual risk of a failure. For example, relationships between failure modes are disregarded when determining a cause of the failure, e.g., when such relationships represent the actual risk. In another example, RPN numbers of the same value may not reflect the same level of risk of failure, which can lead to more serious risk profiles being disregarded over less serious risk profiles.

Another disadvantage of conventional risk management technologies is that it is cumbersome and/or costly to perform tracking between different versions and/or iterations of changes that have been applied, e.g., utilizing FMEA, within a manufacturing and/or product development environment to meet the regulatory requirements Consequently, conventional risk management technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
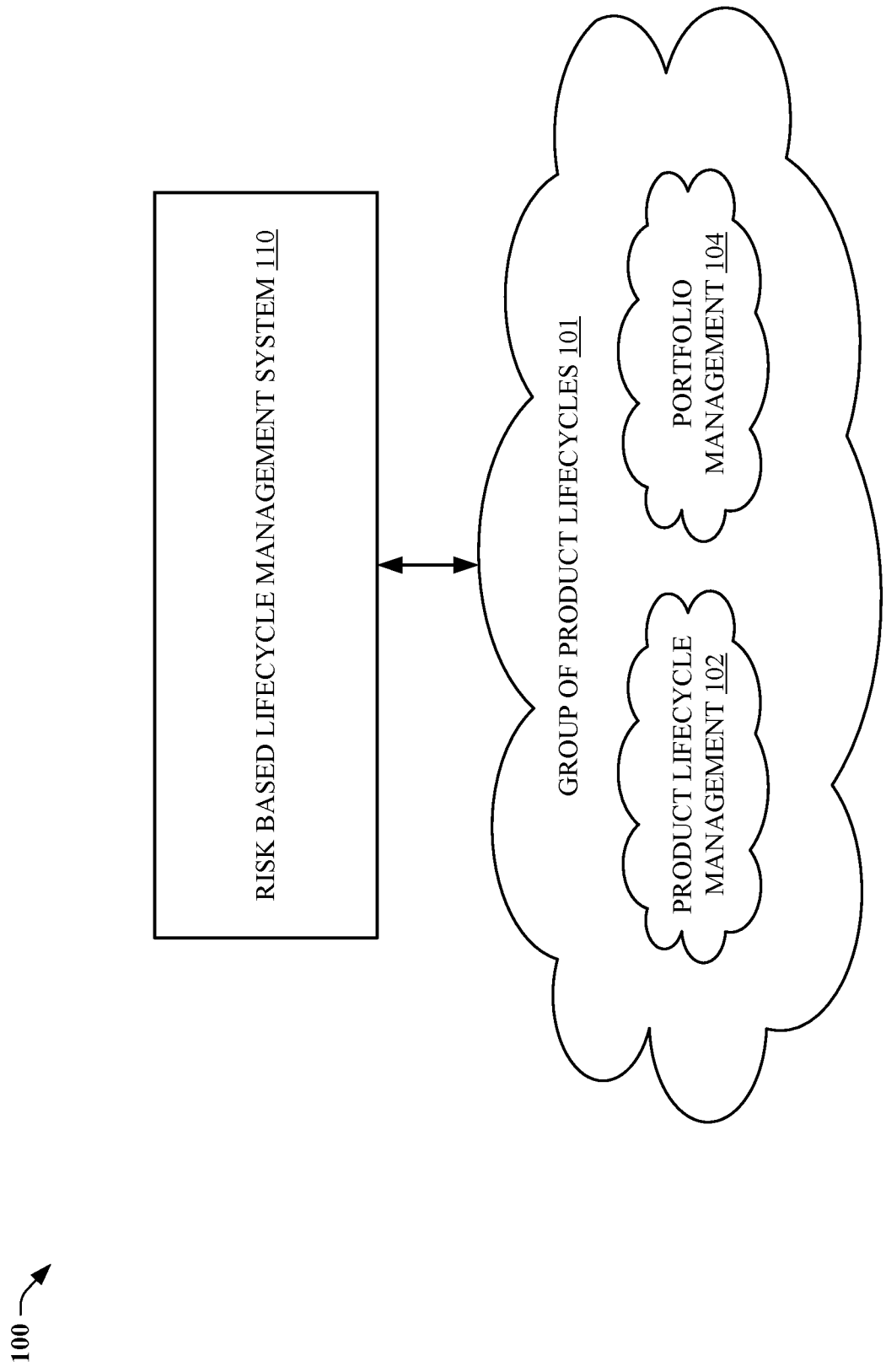
FIG. 1 illustrates a block diagram of a product lifecycle environment comprising a risk based lifecycle management system that facilitates mitigation of effect(s) of potential multi-variant causes of an adverse event on a defined process of a product lifecycle, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional risk management technologies have had some drawbacks such as not being able to identify actual risks of a failure, e.g., by disregarding relationship between failure modes when determining a cause of the failure, and/or by misidentifying serious risks profiles. Further, such technologies lack an ability to effectively track between different FEMA-based versions/iterations of changes that have been applied within a manufacturing and/or product development environment.

On the other hand, in various embodiments disclosed herein, a risk based lifecycle management system can facilitate establishment of a sound, robust, science-based, and risk-justified control strategy (CS) based on continuous improvement, over product lifecycle(s), performed via version control and change management actions. In this regard, the risk based lifecycle management system enables performance and comparison of version control and change management actions across different product portfolios and manufacturing sites—providing a framework for business-based and/or research-based entities to perform risk-based decisions, e.g., on their most business-critical assets, and enabling corresponding actions to be tracked for conformance to, and in of anticipation of, regulatory compliance.

For example, the risk based lifecycle management system can mitigate effect(s) of potential multi-variant causes of an adverse event on a defined process of a product lifecycle; perform change control management actions with respect to modifying a defined risk profile corresponding to the defined process, and track changes that have been made, via the modification, to the defined risk profile.

In another example, the risk based lifecycle management system can perform CS continuous improvement actions for continuous improvement of a CS of the defined process; perform CS continuous improvement actions with respect to application of the CS at different locations from which the defined process is performed; perform portfolio management actions with respect to application of the CS on different process ontologies; and/or perform regulatory control assurance actions with respect to publication of a genealogy of control strategies representing differences between the control strategies.

In embodiment(s), the risk based lifecycle management system comprises a processor, coupled to a memory, that executes or facilitates execution of executable components, comprising: a mapping component that determines a process ontology of a defined process—the process ontology comprising process steps of the defined process and objects comprising respective attributes corresponding to respective performances, during a lifecycle of the defined process, of the process steps. Further, the mapping component associates, via a data storage device, e.g., a tracing matrix, a process step of the process steps with respective objects of the objects—the respective objects comprising attributes of the respective attributes corresponding to a performance, of the respective performances, of the process step.

The risk and lifecycle management system further comprises a tracing component and a CS component. The tracing component detects an event corresponding to the performance of the process step, and associates, via the tracing matrix, the event with the process step and the respective objects comprising the respective attributes corresponding to the performance of the process step.

The CS component, utilizing a machine learning model, determines whether the event corresponds to a defined risk profile comprising defined failure modes of the defined process step. In this regard, in response to the event being determined, by the CS component, to correspond to the defined risk profile, the CS component selects, from the defined failure modes, a group of defined failure modes as candidates of causality of the event representing potential multi-variant causes of the event, and sends the candidates of causality of the event directed to a user identity to facilitate application of corrective actions to the process step to facilitate mitigation of effects of the potential multi-variant causes of the event on the defined process.

In other embodiment(s), a method comprises: determining, by a system (e.g., a risk based lifecycle management system) comprising a processor, a process ontology comprising process steps of a defined process and entities comprising respective attributes that affect respective performances of the process steps during a lifecycle of the defined process; associating, by the system utilizing a tracing matrix, a process step of the process steps with respective entities of the entities and with the respective attributes of the entities; in response to detecting an event representing an output of a performance, of the respective performances, of a process step of the process steps, associating, by the system via the tracing matrix, the event with the process step, the respective entities, and the respective attributes of the entities; and in response to determining, utilizing a machine learning model, that the event corresponds to a defined risk profile that has been stored in a knowledge retention data store and that comprises defined failure modes of the defined process step, selecting, by the system utilizing the machine learning model, a group of defined failure modes of the defined failure modes as candidates of causality of the event representing multi-variant causes of the event, and publishing, by the system, the candidates of causality of the event to facilitate, utilizing the machine learning model, modification of a CS to mitigate respective effects of the group of defined failure modes on the defined process step.

In yet other embodiment(s), a machine-readable storage medium comprises executable instructions that, when executed by a processor, facilitate performance of operations, comprising: in response to determining a process ontology comprising process steps of a defined process and respective objects comprising respective attributes that affect respective performances of the process steps during a lifecycle of the defined process, creating a tracing matrix that identifies relationships between a process step of the process steps, the respective objects, and the respective attributes of the objects; detecting an event representing a performance of the respective performances of the process step; correlating, via the tracing matrix, the event with the process step, the respective objects, and the respective attributes of the objects; determining, utilizing a machine learning model, whether the event corresponds to a defined risk profile of a CS that has been stored in a knowledge retention data store, wherein the defined risk profile represents defined failure modes of the process step; and in response to determining that the event corresponds to the defined risk profile, selecting, via the machine learning model, a portion of the defined failure modes as candidates of causality of the event representing multi-variant causes of the event, and outputting the candidates of causality of the event to facilitate, via the machine learning model, modification of the CS to mitigate respective effects of the group of defined failure modes on the process step.

Figure 2:
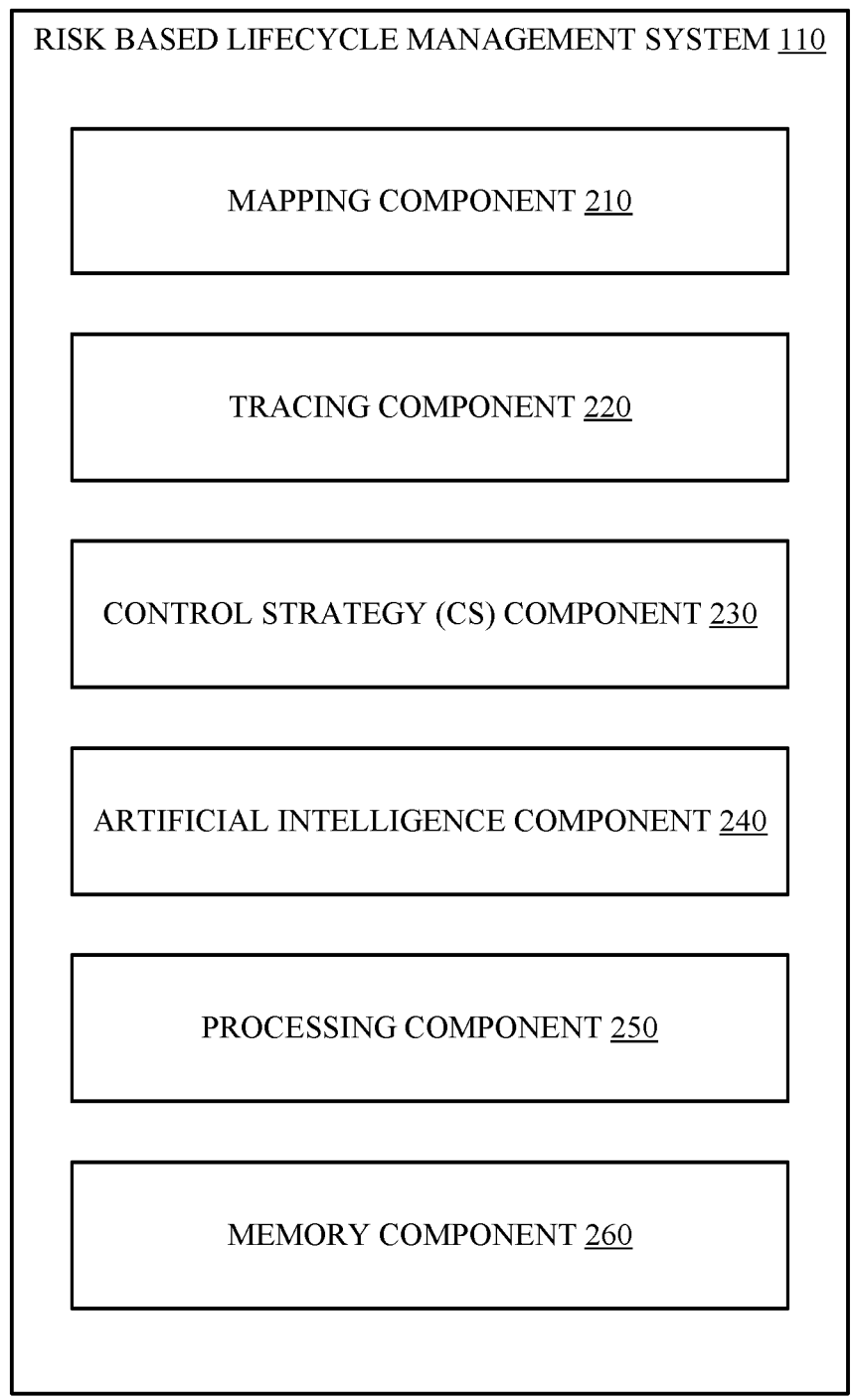
FIG. 2 illustrates a block diagram of a risk based lifecycle management system that facilitates mitigation of effect(s) of potential multi-variant causes of an adverse event on a defined process of product lifecycle, in accordance with various example embodiments.
Figure 3:
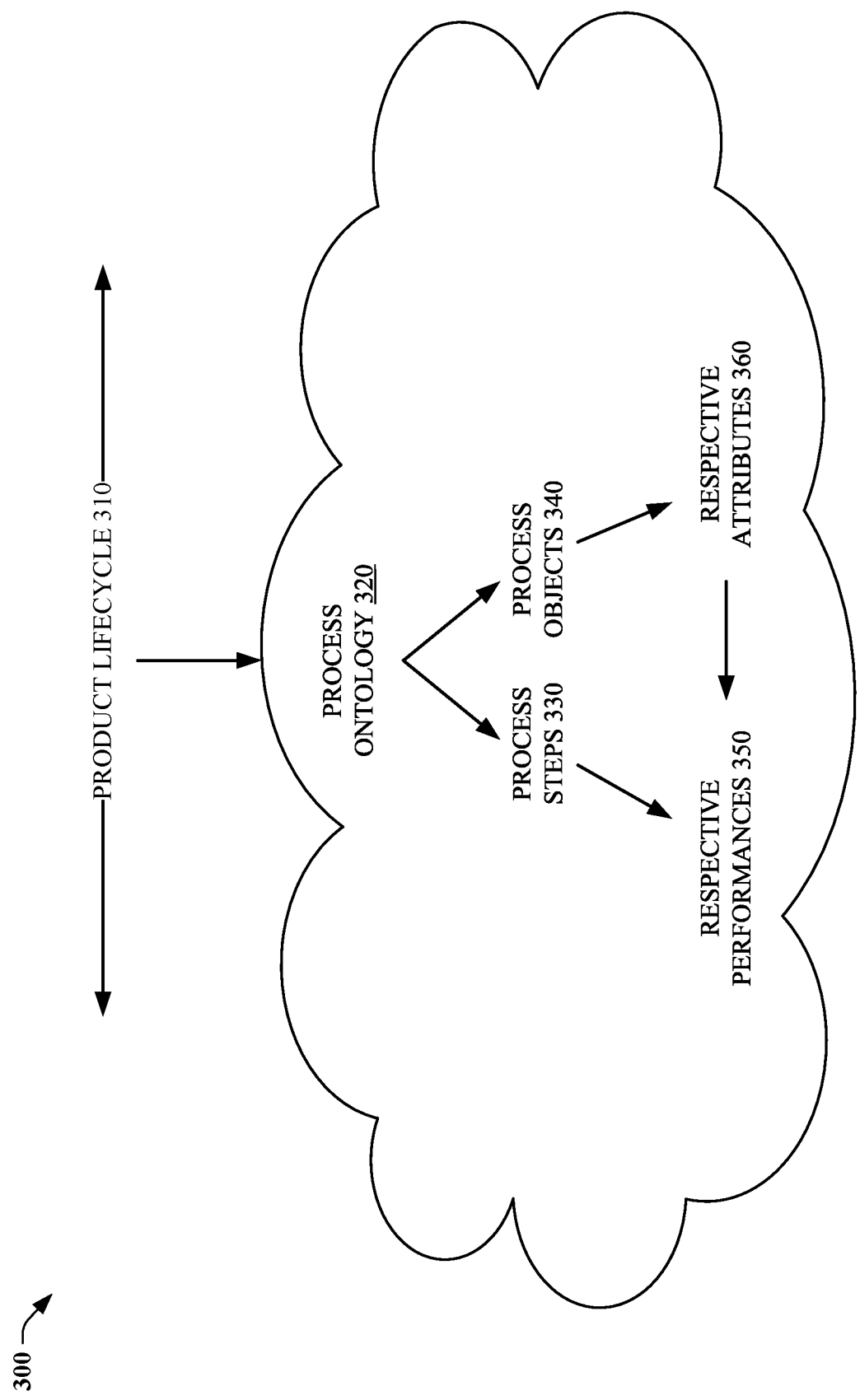
FIG. 3 illustrates a block diagram of process ontology of a product lifecycle, in accordance with various example embodiments.

Now referring to FIGS. 1-3, block diagrams (100, 200, 300) of a product lifecycle environment, a risk based lifecycle management system (110), and a product lifecycle (310) and corresponding process ontology (320) are illustrated, in accordance with various example embodiments. The risk based lifecycle management system utilizes risk assessment to facilitate management and improvement of product lifecycle decisions for a group of product lifecycles (101) corresponding to product development, manufacturing, and/or production, e.g., within a regulated manufacturing environment. The group of product lifecycles can correspond to various industries, e.g., pharmaceutical, aerospace, medical device, biotech, regulated, or other type of managed and/or regulated product development and/or manufacturing activity.

As illustrated by FIG. 2, the risk based lifecycle management system includes a mapping component (210), a tracing component (220), a CS component (230), an artificial intelligence (AI) component (240), a processing component (250), and a memory component (260). In embodiment(s), the risk based lifecycle management system can perform product lifecycle management (102) actions on the group of product lifecycles, such as mitigating effect(s) of potential multi-variant causes of an adverse event on a defined process of a product lifecycle (310) of the group of product lifecycles.

Figure 4:
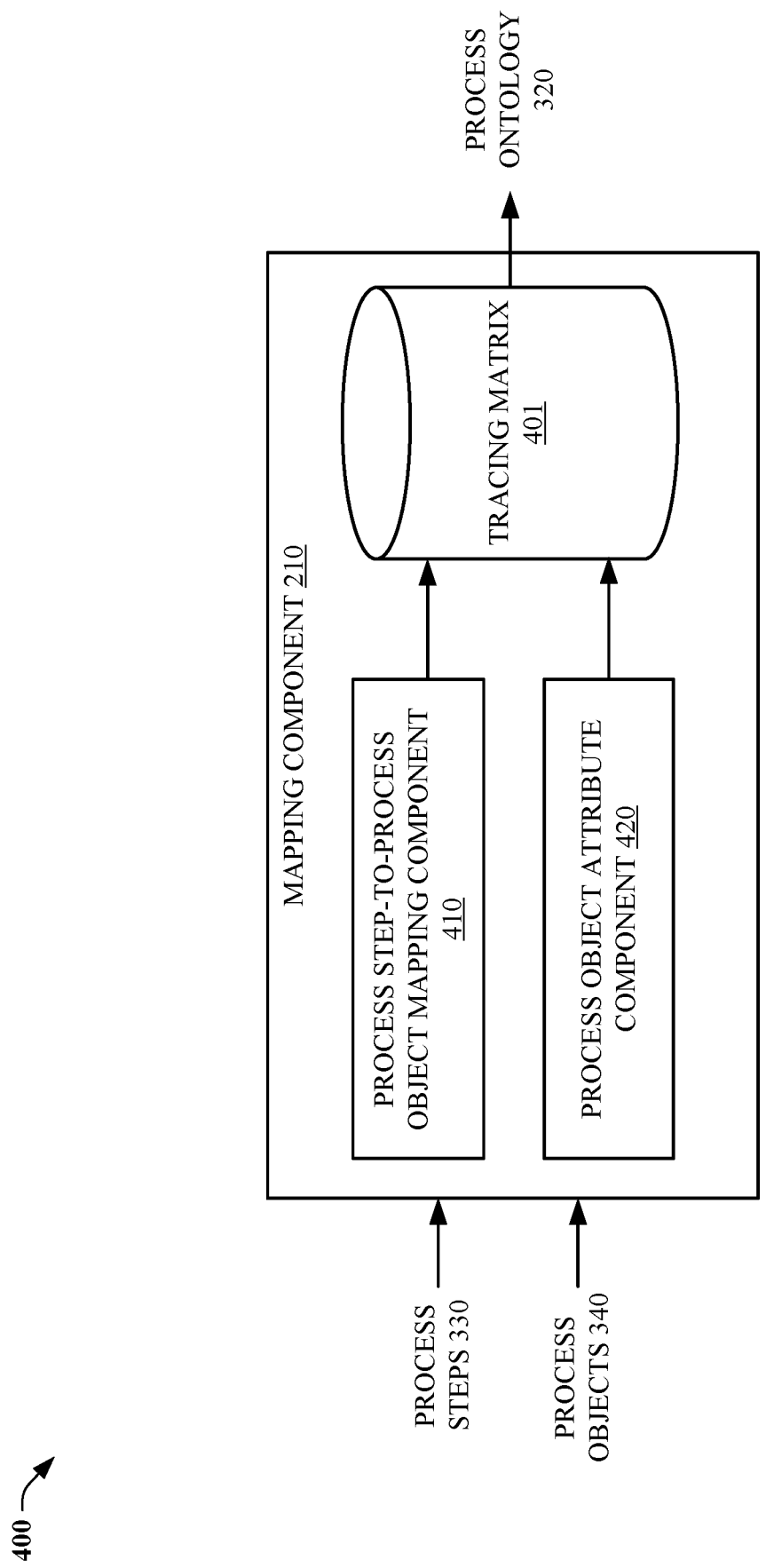
FIG. 4 illustrates a block diagram of a mapping component that determines a process ontology of a defined process, and associates, via a tracing matrix, a process step of the defined process with respective objects comprising attributes corresponding to a performance of the process step, in accordance with various example embodiments.

In this regard, and now referring to FIGS. 3 and 4, the mapping component determines a process ontology (320) of the defined process. The process ontology includes process steps (330) and process objects (340) including respective attributes (360) that affect respective performances (350), during a product lifecycle (310) of the defined process, of the process steps. A process step-to-process object mapping component (410) associates and/or maps, via a tracing matrix (401), e.g., data storage device, a process step of the process steps with respective objects of the process objects. Further, a process object attribute component (420) associates, via the tracing matrix, the respective objects with attributes corresponding to, and/or affecting, a performance of the process step. In embodiment(s), the tracing matrix is a database table including row(s) and column(s) representing the process ontology, in which a row/column of the database table that references the process step is mapped to/associated with respective columns/rows referencing the respective objects and referencing the attributes corresponding to the performance of the process step.

In embodiment(s), the defined process utilizes a group of entities (not shown) that facilitate a process performance of the defined process. For example, the group of entities includes one or more of: equipment suppliers of equipment that include the objects, material suppliers of materials that include the objects, or the objects.

In other embodiment(s), the process step corresponds to ordering of the equipment or the materials, shipping of the equipment or the materials, or manufacturing of the equipment or the materials.

In yet other embodiment(s), the group of process lifecycles corresponds to various stages of a manufacturing process, e.g., pharmaceutical-based manufacture of a drug compound. For example, manufacture of a drug compound in pill, e.g., tablet, form includes various stages, such as granulation of a drug material that forms the pill according to a defined particle size, forming the drug material into the pill, drying the pill, and packaging the pill.

Each stage of the manufacturing process represents a process lifecycle of a defined process, e.g., a granulation process lifecycle, a drying process lifecycle, a packaging process lifecycle. For example, a process ontology of the drying process lifecycle can include process steps of (1) placing, via a first process object (e.g., a robotic manufacturing device) having first attribute(s) (e.g., force of placement, speed of movement) a form including granulated drug material into an oven; (2) drying, via a second process object (e.g., oven) having second attribute(s) (e.g., temperature, humidity, duration of drying) the form to transform the granulated drug material into pills; and (3) packaging, via a third process object (e.g., bottling device) having second attribute(s) (e.g., speed of insertion of pills into a container, pill counter measuring an amount of pills that have been included in the container) the pills into the container.

Figure 5:
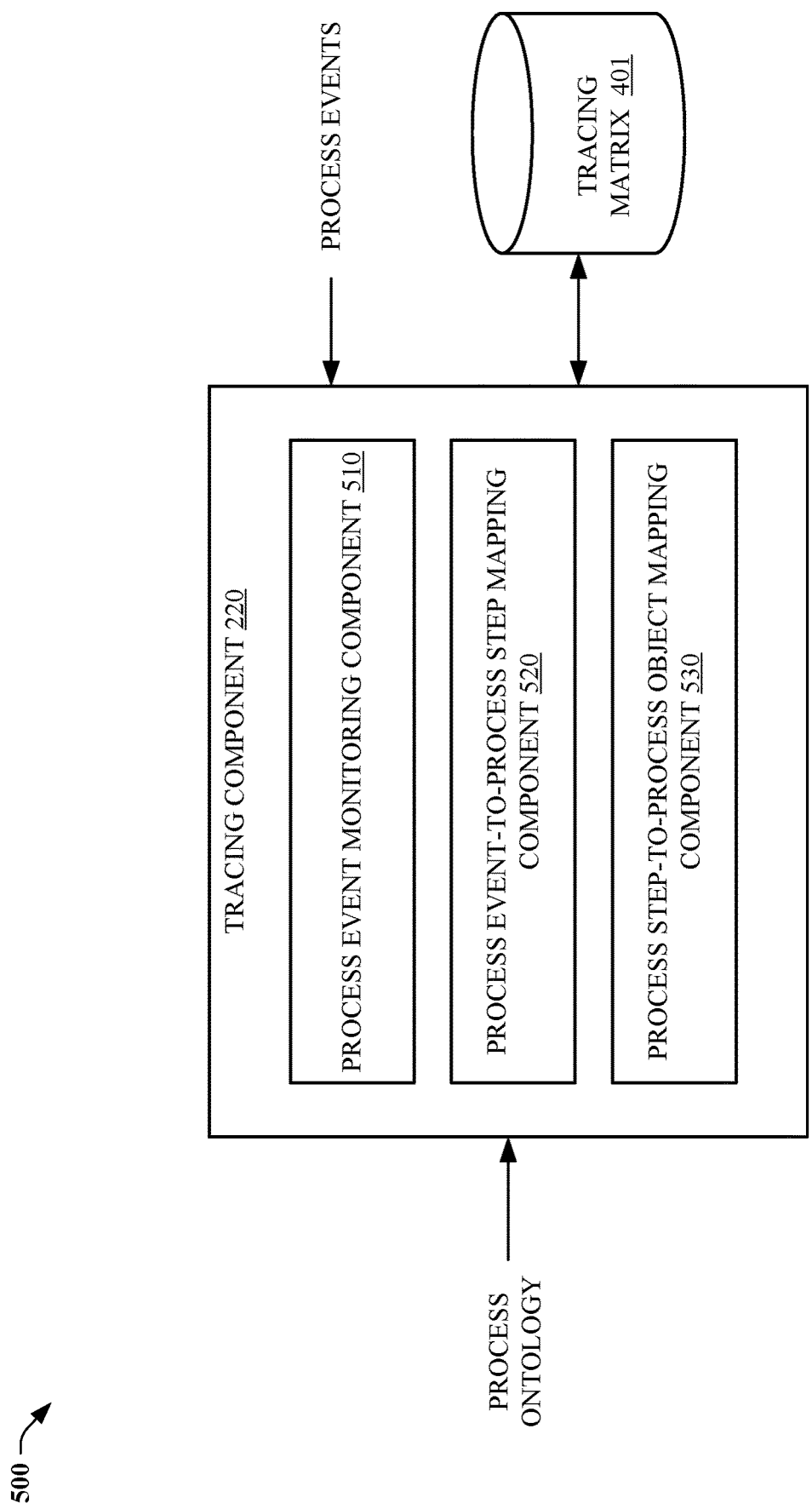
FIG. 5 illustrates a block diagram of a tracing component that detects an event corresponding to a performance of a process step of a defined process, and associates, via a tracing matrix, the event with the process step and respective objects comprising attributes corresponding to a performance of the process step, in accordance with various example embodiments.
Figure 6:
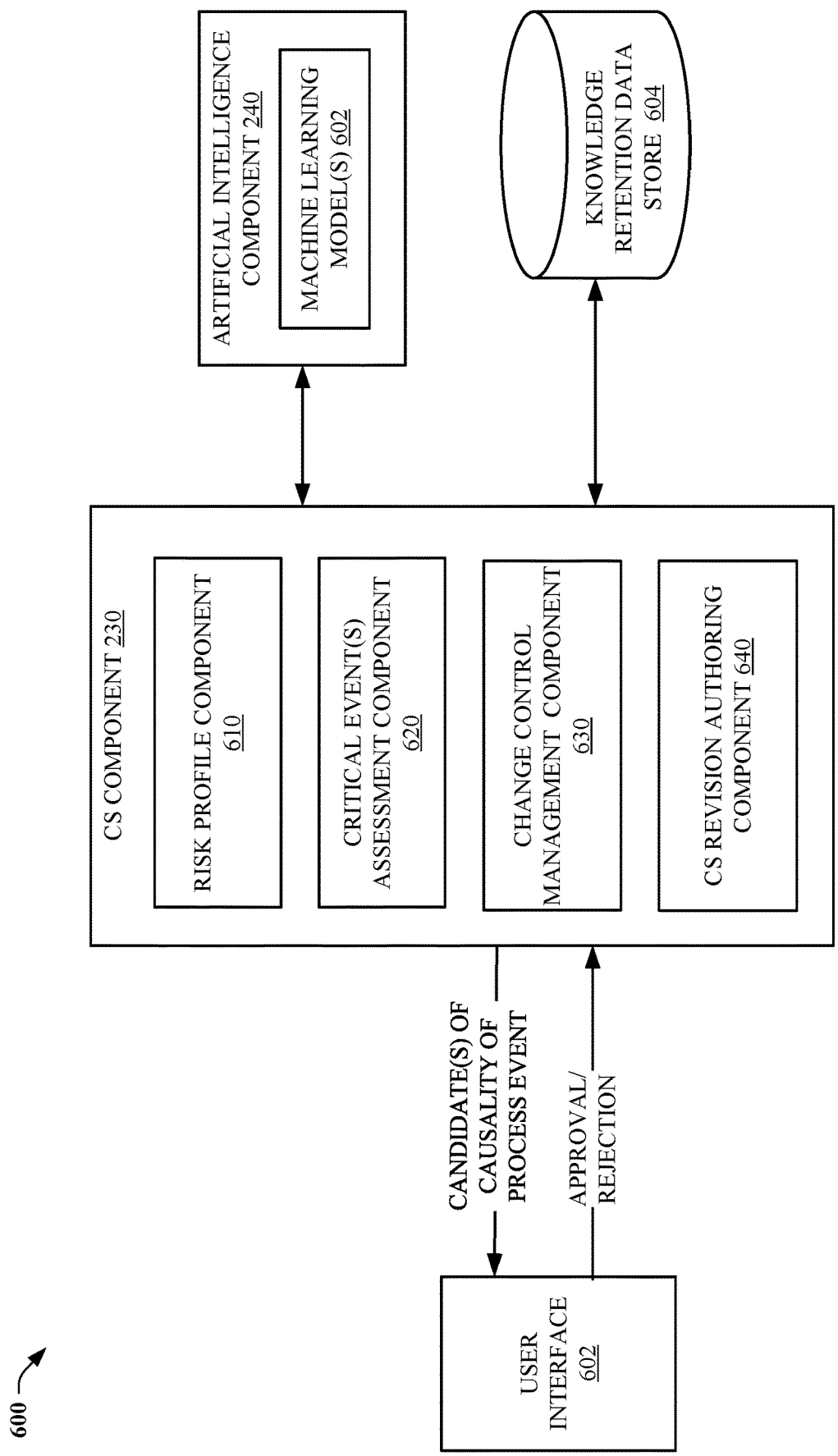
FIG. 6 illustrates a block diagram of a control strategy (CS) component that utilizes a machine learning model to determine that an event corresponds to a defined risk profile comprising defined failure modes of a defined process, and to select a group of defined failure modes as candidates of causality of the event, which represent potential multi-variant causes of the event, to facilitate application of corrective actions to a process step of the defined process for mitigation of effects of the potential multi-variant causes of the event on the defined process. in accordance with various example embodiments.
Figure 7:
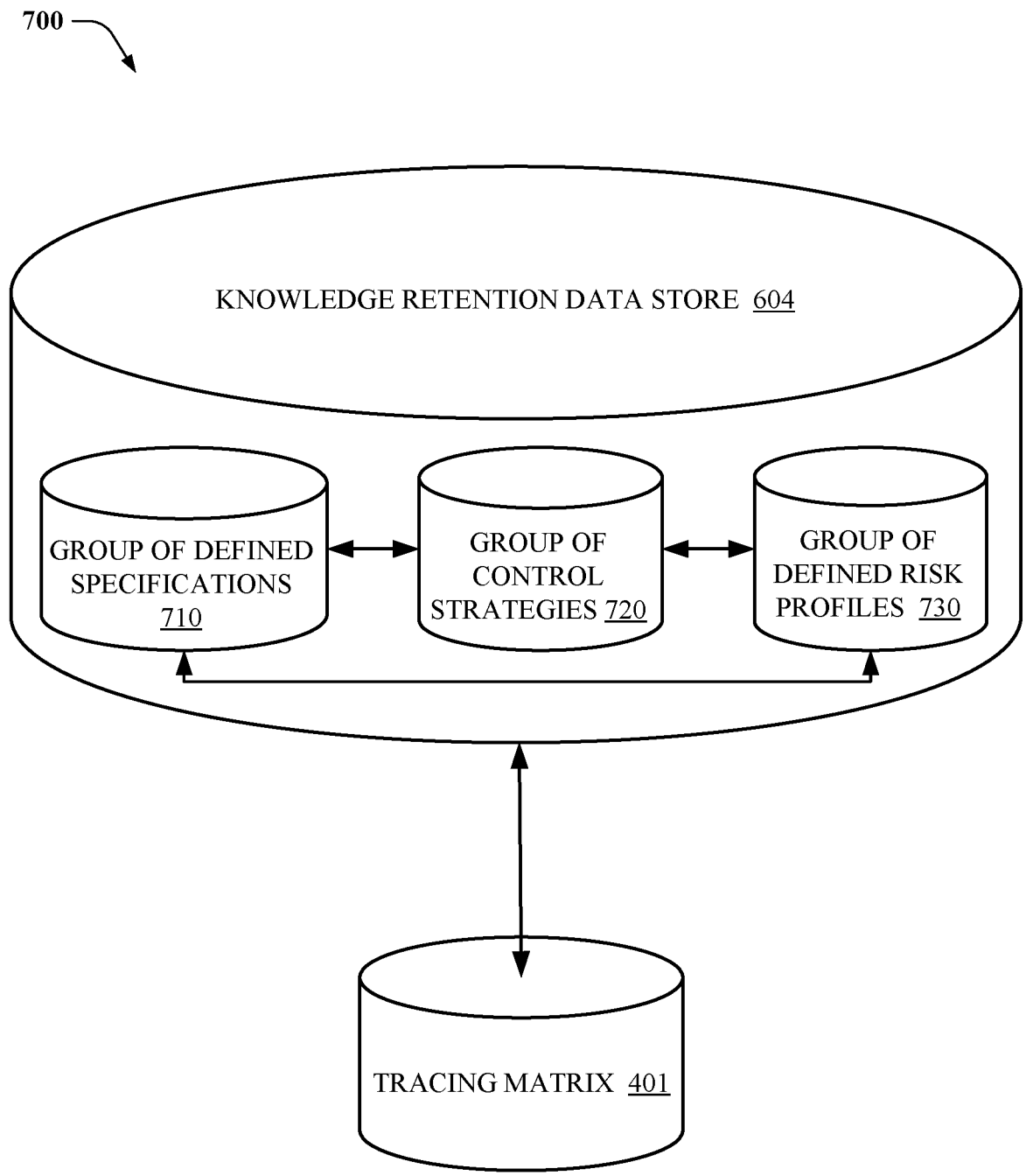
FIG. 7 illustrates a block diagram of a knowledge retention data store communicatively coupled to a tracing matrix that maps a group of defined risk profiles including respective defined failure modes corresponding to respective defined process steps to a group of control strategies, in accordance with various example embodiments.

Each process step of a process ontology is performed by respective objects based on respective attributes of the objects, and the tracing component monitors a performance of each process step. As illustrated by FIG. 5, a process event monitoring component (510) detects an event (e.g., process event) corresponding to the performance of the process step (e.g., that a form including the granulated material has been placed, via the robotic manufacturing device, into the oven; that the granulated material has been dried, via the form, in the oven; that the pills have been packaged in the container). The process event-to-process step mapping component (520) associates, via the tracing matrix using the process ontology of the process step, the event with the process step. Further, the process step-to-process object mapping component (530) associates, via the tracing matrix using the process ontology, the performance of the process step (e.g., including a result of the performance, e.g., whether the performance was successful or has failed) with respective objects and respective attributes corresponding to the performance of the process step.

Referring now to FIGS. 6-9, the CS component includes a risk profile component (610), a critical event(s) assessment component (620), a CS revision authoring component (630), and a change control management component (640). The risk profile component determines, via the AI component using machine learning model(s) (602), whether the event corresponds to a defined risk profile (810) of a group of defined risk profiles (730) that has been stored in a knowledge retention data store (604).

Figure 9:
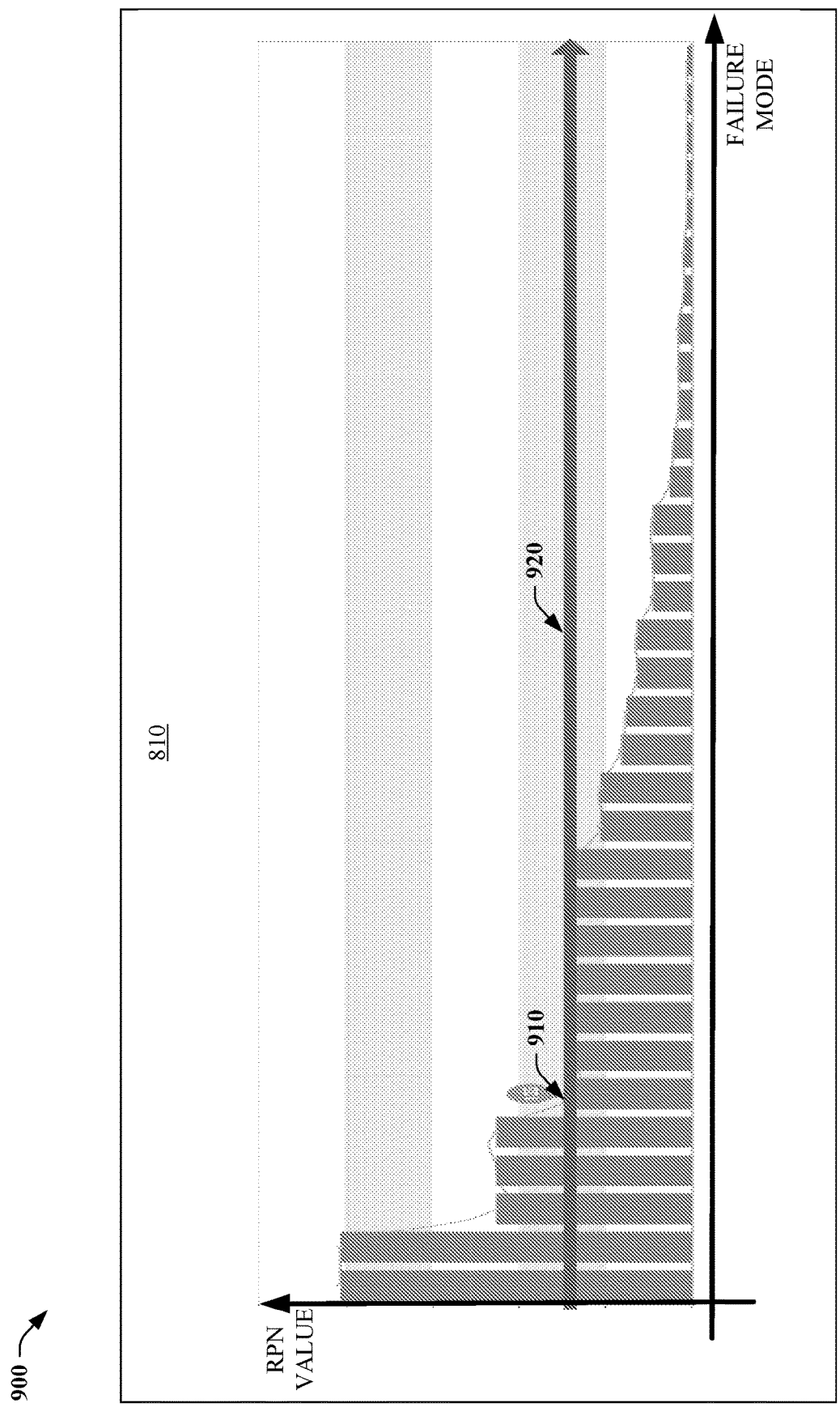
FIG. 9 illustrates a block diagram of a risk profile including defined failure modes corresponding to respective RPN values, in accordance with various example embodiments.

As illustrated by FIG. 9, the defined risk profile includes defined failure modes (820) of the defined process step that are represented by vertical bars, and respective vertical axis values of the defined failure modes represent risk priority numbers (RPNs) that have been assigned to the defined failure modes.

For example, and referring to the example above, in response to the event representing that the pills were not dried and/or formed properly during the drying process lifecycle, the risk profile component determines whether any of the defined failure modes of the defined risk profile correspond to the pills not being dried and/or formed correctly.

In this regard, in response to the event being determined, by the risk profile component, to correspond to the defined risk profile, e.g., to correspond to one or more of the defined failure modes of the defined risk profile, e.g., representing defined failure modes corresponding to the pills not being dried and/or formed correctly, the critical event(s) assessment component selects, from the defined failure modes via the AI component using the machine learning model(s), a group of defined failure modes as candidates of causality of the event representing potential multi-variant causes of the event, e.g., potential multi-variant causes of the pills not being dried and/or formed correctly.

In embodiment(s), the machine learning model comprises a supervised machine learning model, an unsupervised machine learning model, a semi-supervised machine learning model, a deterministic rule-based machine learning model, a probabilistic-based machine learning model, and/or a deep learning model. Further, the machine learning model corresponds to a machine learning process.

In embodiment(s), the critical event(s) assessment component selects the group of defined failure modes as candidates of causality of the event based on a determination that respective RPNs that have been assigned to the group of defined failure modes satisfy a defined condition corresponding to a determined change in a slope of a line connecting values of the respective RPNs—the determined change in slope representing a "knee" (910) of the defined risk profile; and the slope being determined by the critical event(s) assessment component based on respective RPN values that have been assigned to the defined failure modes (e.g., which have been ordered sequentially along the x-axis from highest RPN value to lowest RPN value)

Figure 8:
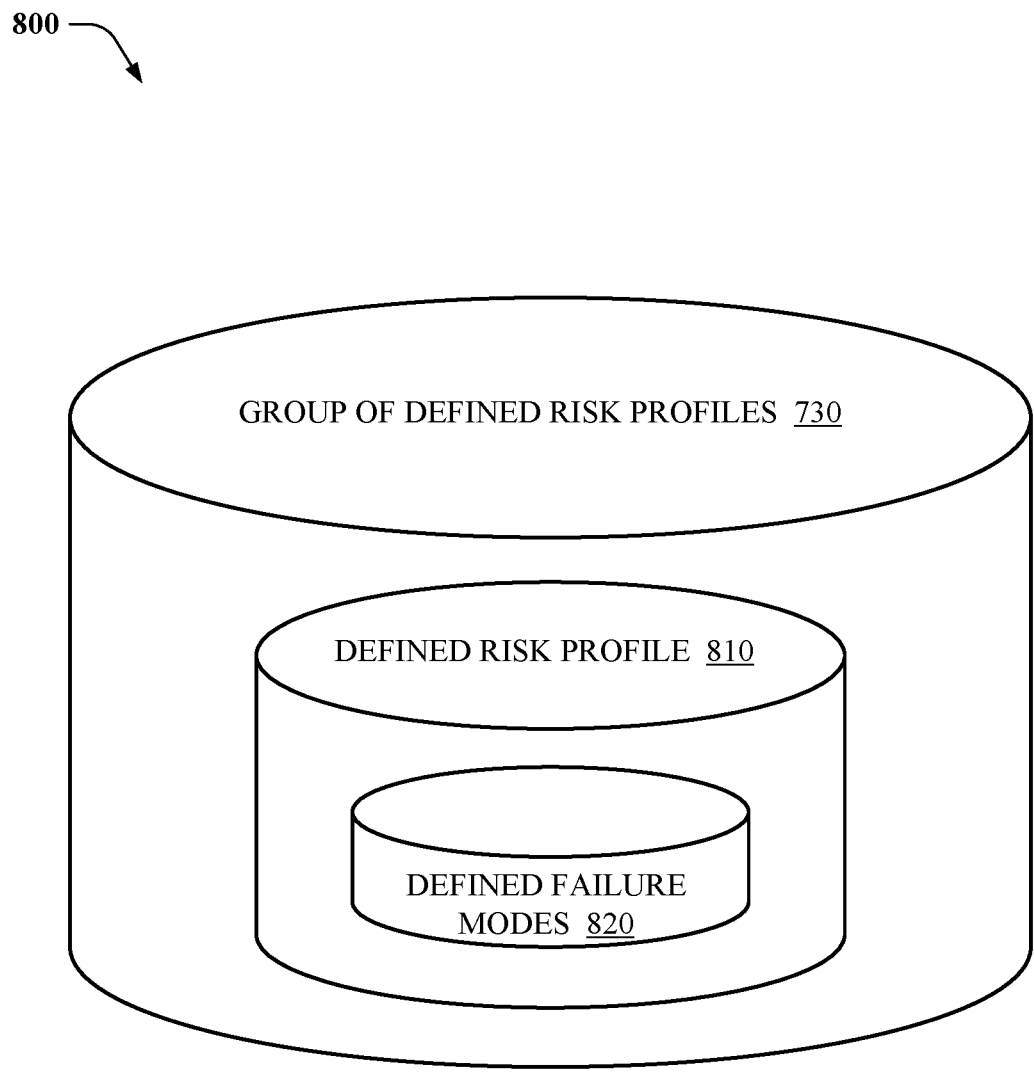
FIG. 8 illustrates a block diagram of a group of defined risk profiles including a defined risk profile that represents defined failure modes of a defined process step, in accordance with various example embodiments.

For example, in an embodiment illustrated by FIG. 8, the critical event(s) assessment component selects, via the AI component using the machine learning model(s), the group of defined failure modes based on a determination that values of the respective RPNs are greater than a defined RPN value (920) corresponding to the determined change in the slope of the line, e.g., the critical event(s) assessment component selects defined failure nodes having values of RPNs that are above the knee.

In other embodiment(s), the critical event(s) assessment component selects, via the AI component using the machine learning model(s), the group of defined failure modes based on a defined relationship between a defined nominal operating range (NOR) of an attribute of the respective attributes corresponding to the performance of the process step and a defined proven acceptable range (PAR) of the attribute, in which the defined NOR and the defined PAR have been defined by a specification of a group of defined specifications (710) that has informed the process step—the group of defined specifications being included in the knowledge retention data store and corresponding to the group of defined risk profiles and a group of control strategies (720) that have been stored in the knowledge retention data store. In this regard, the group of defined risk profiles and the group of defined specifications inform and/or specify the group of control strategies.

For example, in an embodiment, in response to the attribute being determined to correspond to a failure mode of the defined failure modes, the critical event(s) assessment component, selects, via the AI component using the machine learning model(s), the failure mode as a candidate of causality of the candidates of causality in response to a determination that the attribute is outside of the defined NOR.

In another embodiment, in response to the attribute being determined to correspond to a failure mode of the defined failure modes, the critical event(s) assessment component, selects, via the AI component using the machine learning model(s), the failure mode as a candidate of causality of the candidates of causality in response to a first determination that the attribute is outside of the defined NOR, and in response to a second determination that the attribute is within the defined PAR.

In yet another embodiment, the critical event(s) assessment component determines whether there is an interaction between different failure modes—the interaction representing that the different failure modes function together as possible multi-variant root causes of the event. In this regard, in response to a third determination that a second attribute (different from the attribute (e.g., a first attribute)) corresponding to a second failure mode (different from the failure mode (e.g., a first failure mode)) is outside of a second defined NOR of the second attribute, the critical event(s) assessment component selects the second failure mode as a second candidate of causality of the candidates of causality (e.g., the candidate of causality being a first candidate of causality).

Referring again to FIG. 6, in response to the group of defined failure modes being selected by the critical event(s) assessment component as candidate(s) of causality of the event, the CS revision authoring component sends, e.g., via a user interface (602), the candidate(s) of causality of the event directed to a user identity of a user of the risk based lifecycle management system to facilitate approval/rejection, by the user identity via the user interface, of generation of a control strategy that represents application of corrective actions to be performed, based on the candidate(s) of causality of the event, on the process step, e.g., to facilitate mitigation of effects of the potential multi-variant causes of the event on the defined process.

For example, in response to determining that the user identity has approved generation of the control strategy, the risk based lifecycle management system can perform change control management actions with respect to modifying a defined risk profile corresponding to the defined process; tracking changes that have been made to the defined risk profile; and/or testing/evaluating application of a modified control strategy on the process step, e.g., to facilitate continuous improvement of a CS of the defined process.

In embodiment(s), the defined risk profile is a first risk profile version that has been stored in the knowledge retention data store, the defined failure modes are first failure mode versions of failure modes, and the first risk profile version represents a first control strategy that facilitates mitigation of respective effects of the first failure mode versions of failure modes on the defined process step.

Further, in response to a determination that an application of a second control strategy (e.g., that has been generated and/or represented by a second risk profile version comprising the group of defined failure modes) to the defined process step satisfies a defined risk mitigation condition representing that the effects of the potential multi-variant causes of the event on the defined process have been mitigated, the change control management component associates, via the tracing matrix, the first failure mode version with the second failure mode version, e.g., to facilitate tracking of changes/differences between the first risk profile version and the second risk profile version.

In turn, the change control management component generates a second control strategy represented by the second risk profile version, and stores the second control strategy in the knowledge retention data store.

Further, the change control management component, in response to the determination that the application of the second control strategy to the defined process step satisfies the defined risk mitigation strategy, modifies, based on the second risk profile version, a defined specification representing the second control strategy and corresponding to the second risk profile version, and stores the defined specification in the knowledge retention data store, e.g., facilitating continuous improvement of the CS of the defined process.

Figure 10:
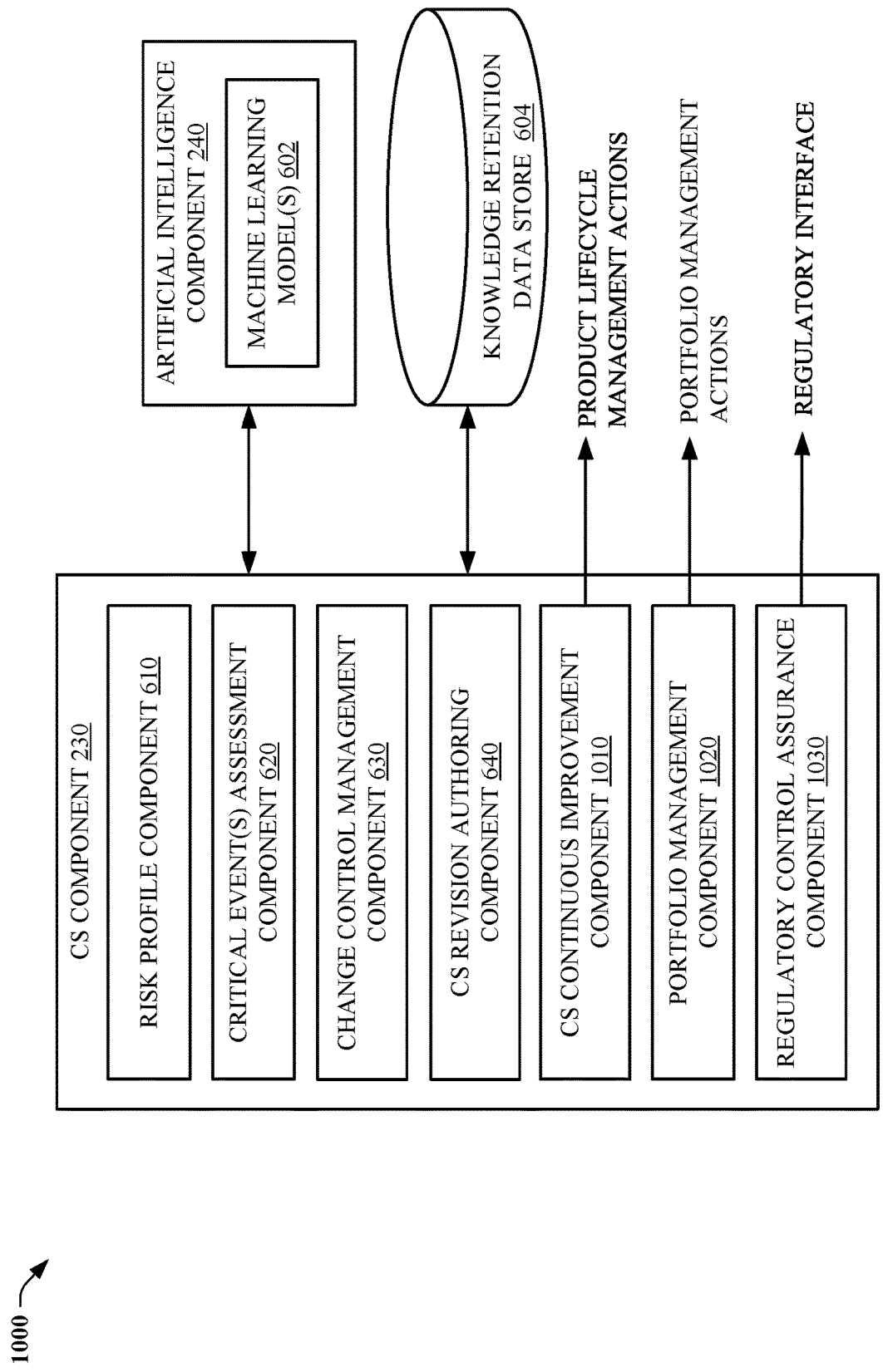
FIG. 10 illustrates a block diagram of a CS component that includes a CS continuous improvement component for performance of product lifecycle management actions, a portfolio management component for performance of portfolio management actions, and a regulatory control assurance component for performance of a regulatory interface, in accordance with various example embodiments.
Figure 11:
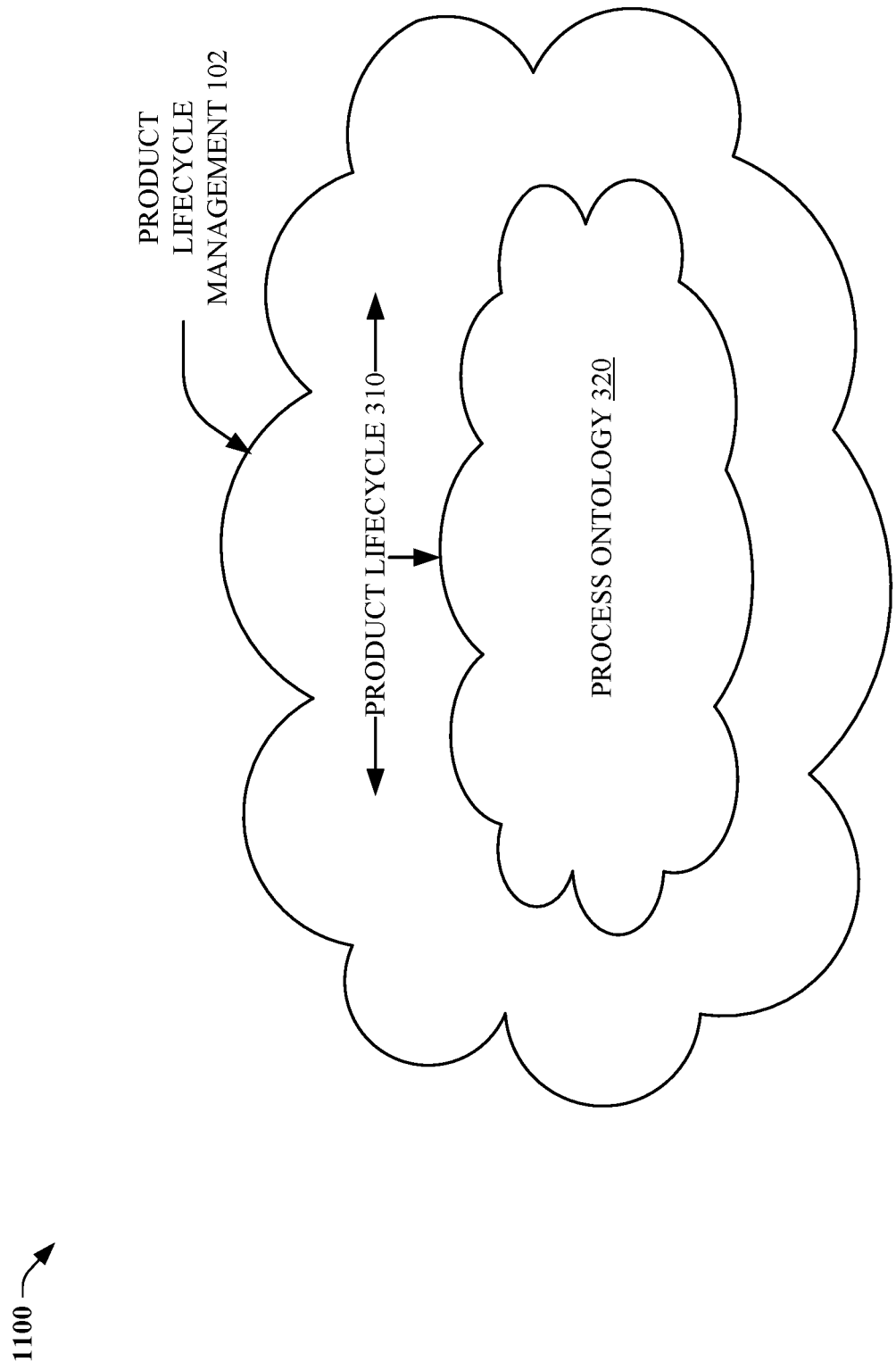
FIG. 11 illustrates a block diagram corresponding to product lifecycle management, in accordance with various example embodiments.

In embodiment(s) illustrated by FIGS. 1 and 10-11, the risk based lifecycle management system can perform CS continuous improvement actions, via product lifecycle management (102), with respect to application of the CS, utilizing product lifecycle management actions, at different locations (not shown) from which the defined process is performed. In this regard, in response to a determination that application of the second control strategy to the defined process step, e.g., corresponding to product lifecycle 310, at a first location, satisfies the defined risk mitigation strategy, a CS continuous improvement component (1010) facilitates, via product lifecycle management actions, application of the second control strategy on the defined process step to be performed at a second location, different from the first location.

Figure 12:
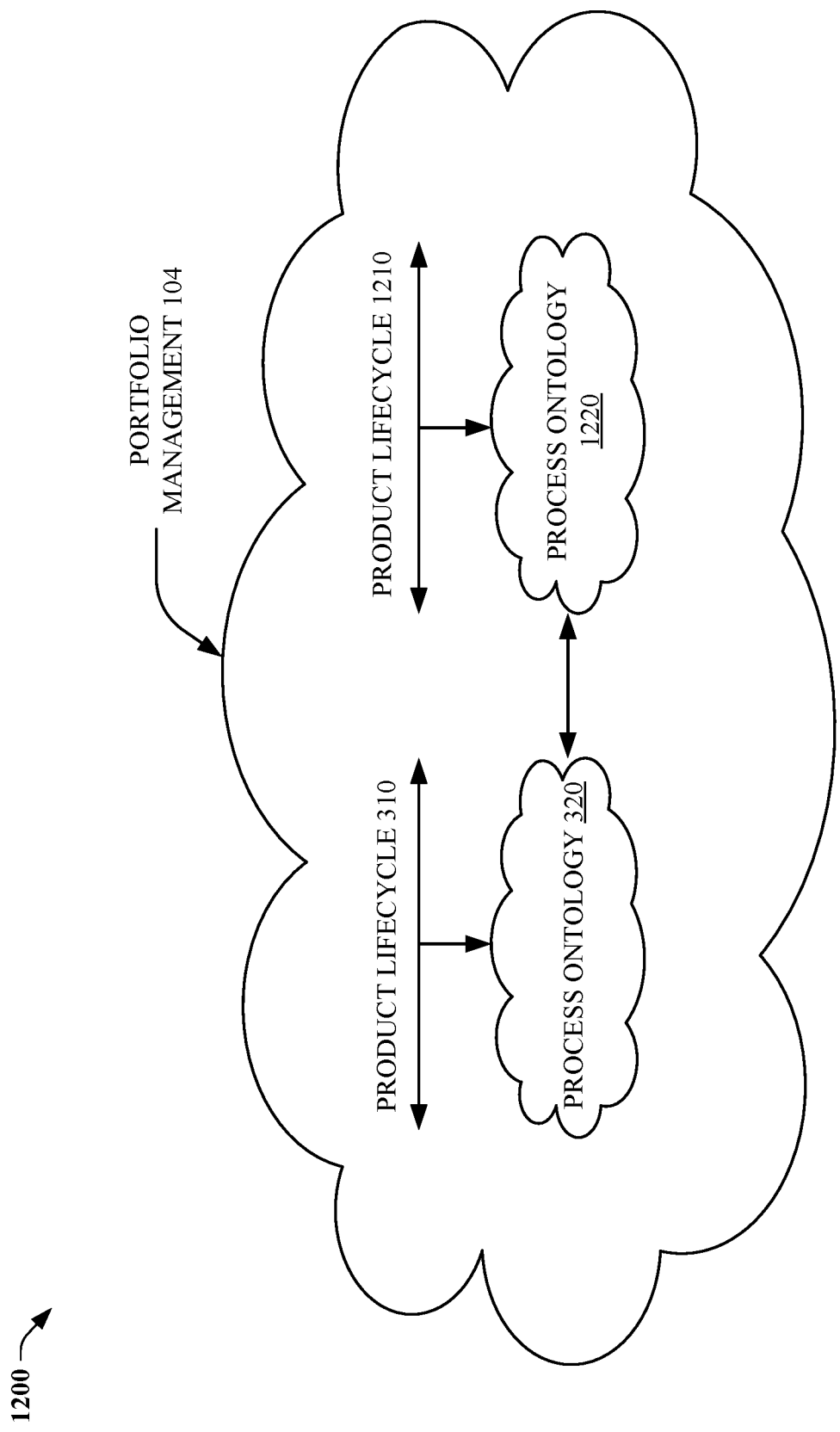
FIG. 12 illustrates a block diagram corresponding to portfolio management, in accordance with various example embodiments.

In other embodiment(s) illustrated by FIGS. 1, 10, and 12, the risk based lifecycle management system can perform CS continuous improvement actions, via portfolio management (104), with respect to application of the CS, utilizing portfolio management actions, on different process ontologies.

For example, in one embodiment, the process ontology is a first process ontology (320), the defined process is a first defined process, and the defined process step is a first defined process step. Further, in response to the determination that the application of the second control strategy to the first defined process step satisfies the defined risk mitigation strategy, a portfolio management component (1020) facilitates, via portfolio management actions, application of the second control strategy on a second process step of a second defined process of a second process ontology (1220) that is different from the first process ontology—the second process ontology corresponding to product lifecycle 1210.

In yet other embodiment(s) illustrated by FIG. 10, the risk based lifecycle management system can perform regulatory control assurance actions with respect to publication of a genealogy of control strategies representing differences between the control strategies and/or versions of the control strategies. In this regard, a regulatory control assurance component (1030) publishes, via a regulatory interface (e.g., corresponding to a regulatory entity associated with product development and/or manufacturing-based compliance) utilizing the tracing matrix and the knowledge retention data store, a genealogy of a first control strategy/first version of control strategy and a second control strategy/second version of control strategy—the genealogy representing differences between the first control strategy and the second control strategy.

FIGS. 13-17 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 13:
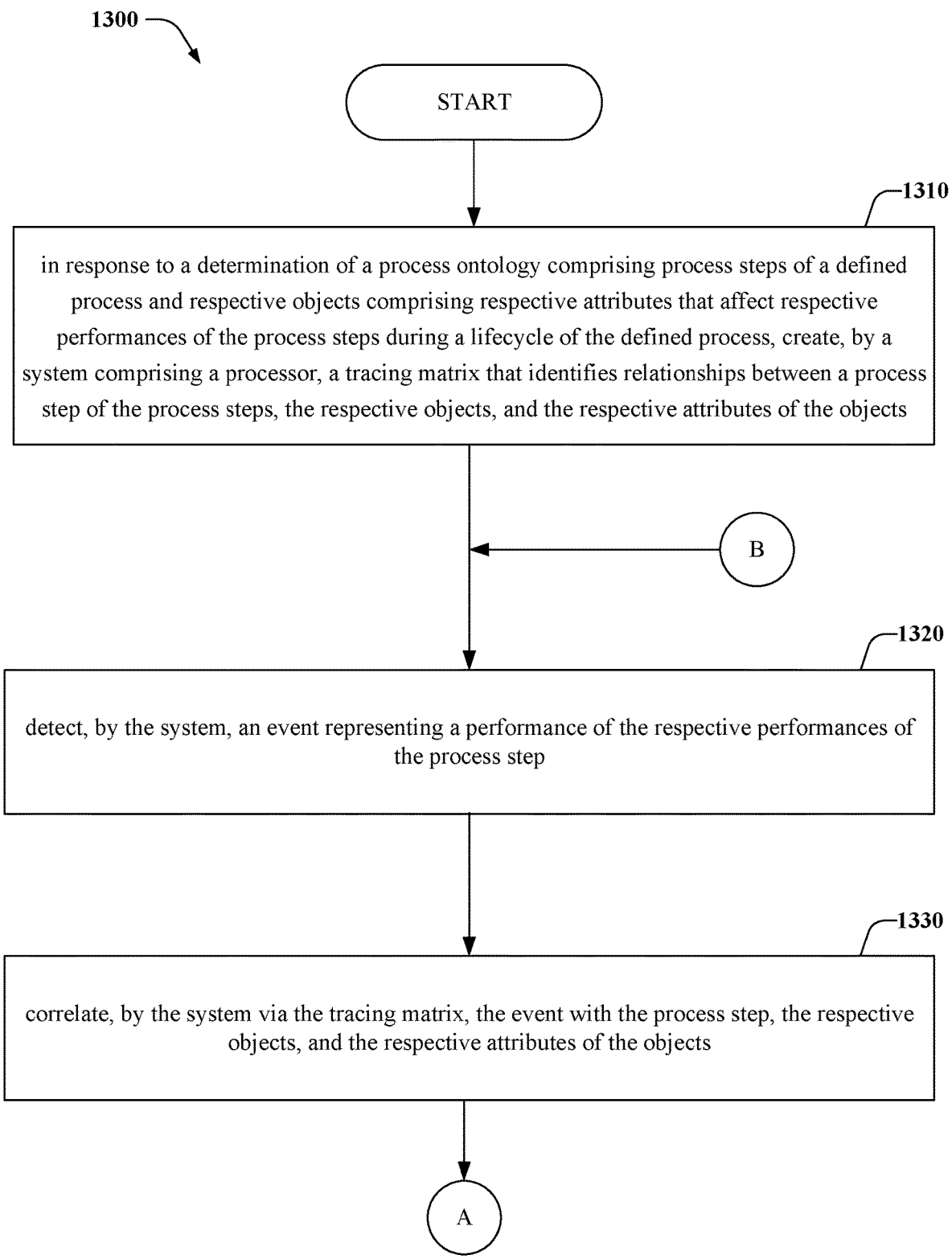
FIGS. 13-17 illustrate flow charts of methods associated with a risk based lifecycle management system that facilitates mitigation of effect(s) of potential multi-variant causes of an adverse event on a defined process of a product lifecycle, in accordance with various example embodiments.
Figure 14:
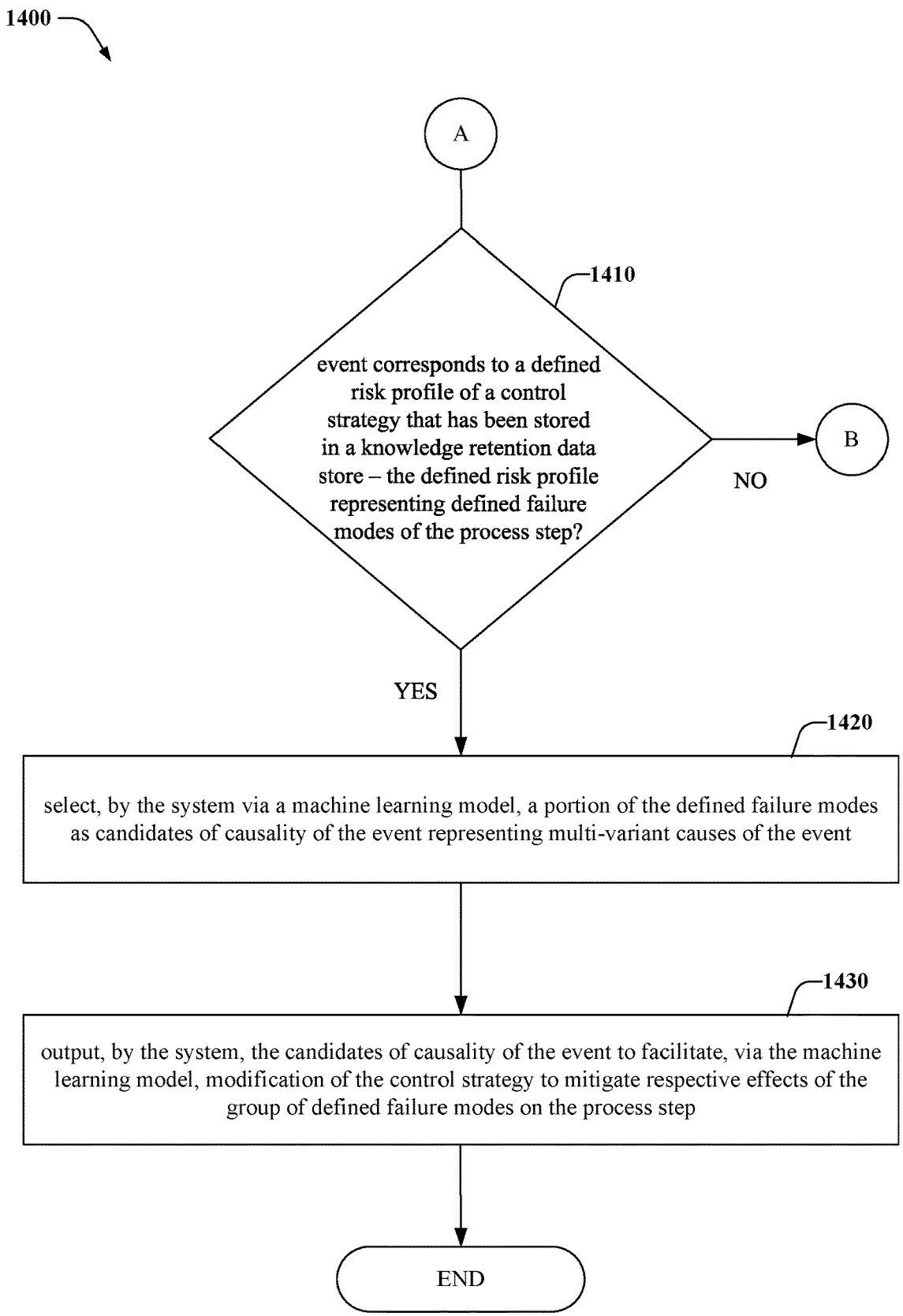

Referring now to FIGS. 13 and 14, a process performed by a system (e.g., 110) comprising a processor (e.g., processing component 250) coupled to a memory (e.g., memory component 260), is illustrated, in accordance with various embodiments. At 1310, in response to a determination of a process ontology comprising process steps of a defined process and respective objects comprising respective attributes that affect respective performances of the process steps during a lifecycle of the defined process, the system creates a tracing matrix that identifies relationships between a process step of the process steps, the respective objects, and the respective attributes of the objects.

At 1320, the system detects an event representing a performance of the respective performances of the process step. At 1330, the system correlates, via the tracing matrix, the event with the process step, the respective objects, and the respective attributes of the objects.

At 1410, in response to a determination that the event corresponds to a defined risk profile of a control strategy that has been stored in a knowledge retention data store—the defined risk profile representing defined failure modes of the process step—flow continues to 1420, at which the system selects, via a machine learning model, a portion of the defined failure modes as candidates of causality of the event representing multi-variant causes of the event; otherwise flow returns to 1320.

Flow continues from 1420 to 1430, at which the system outputs, e.g., via a user interface, the candidates of causality of the event to facilitate, via the machine learning model, modification of the control strategy to mitigate respective effects of the group of defined failure modes on the process step.

Figure 15:
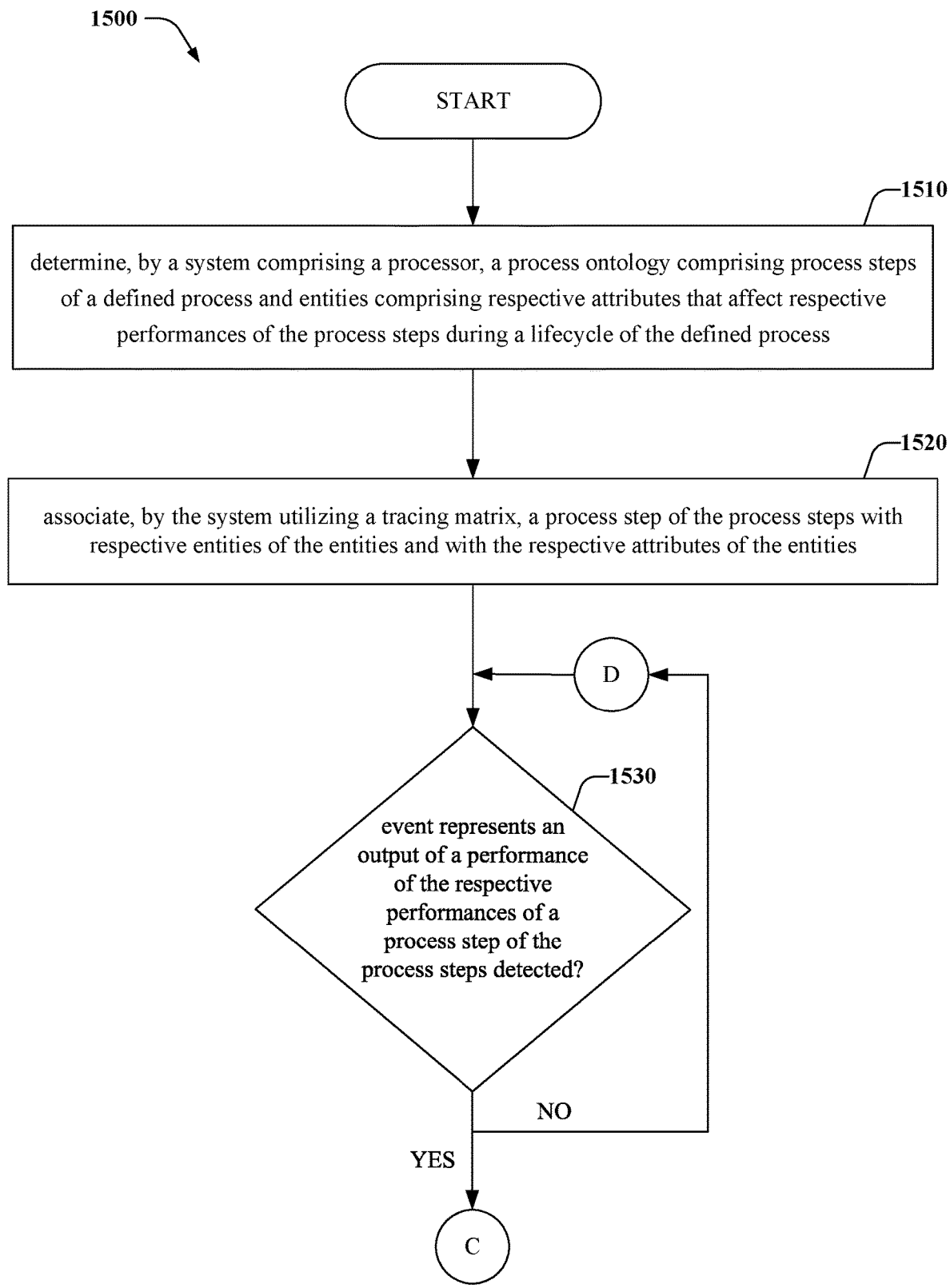
Figure 16:
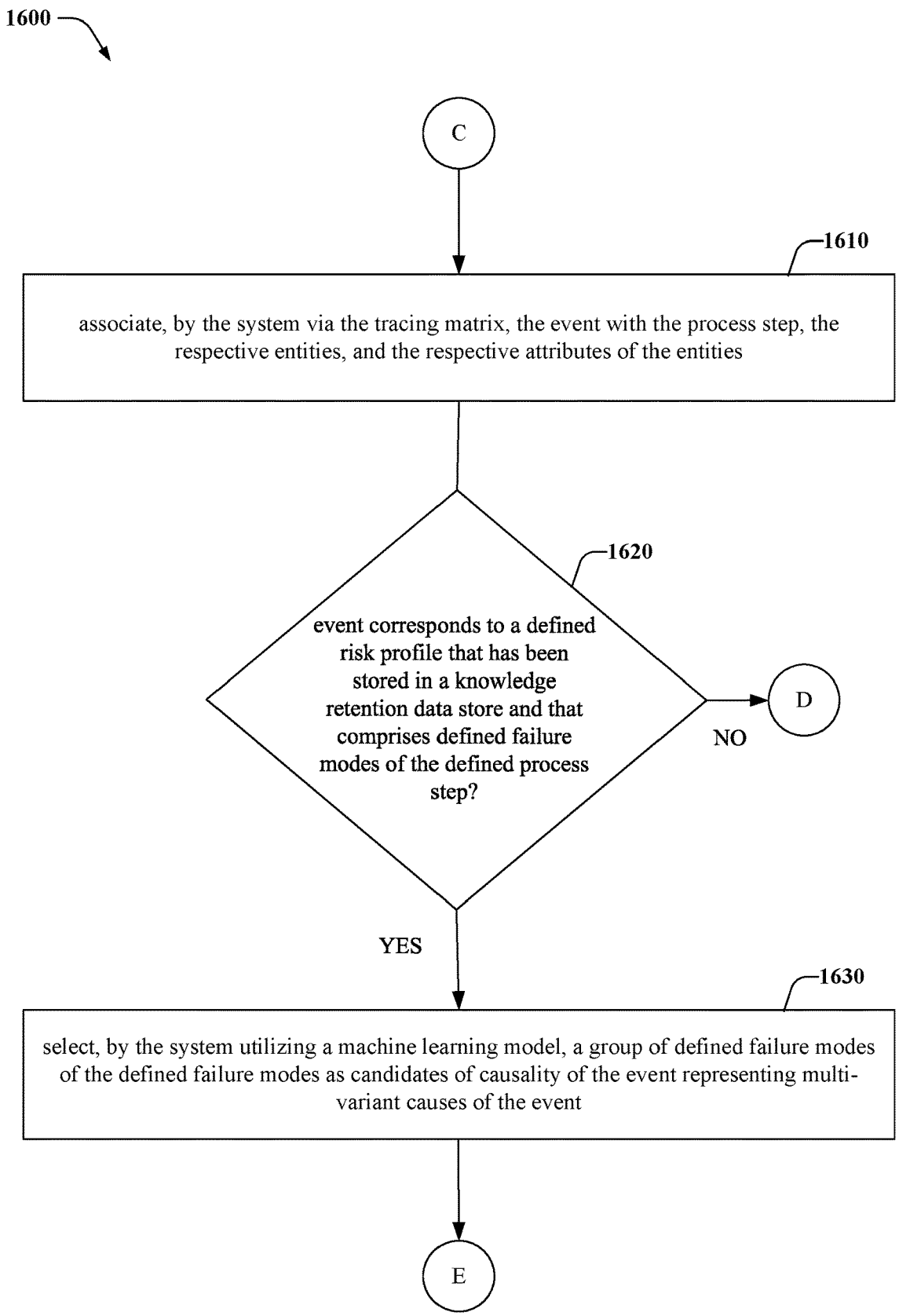
Figure 17:
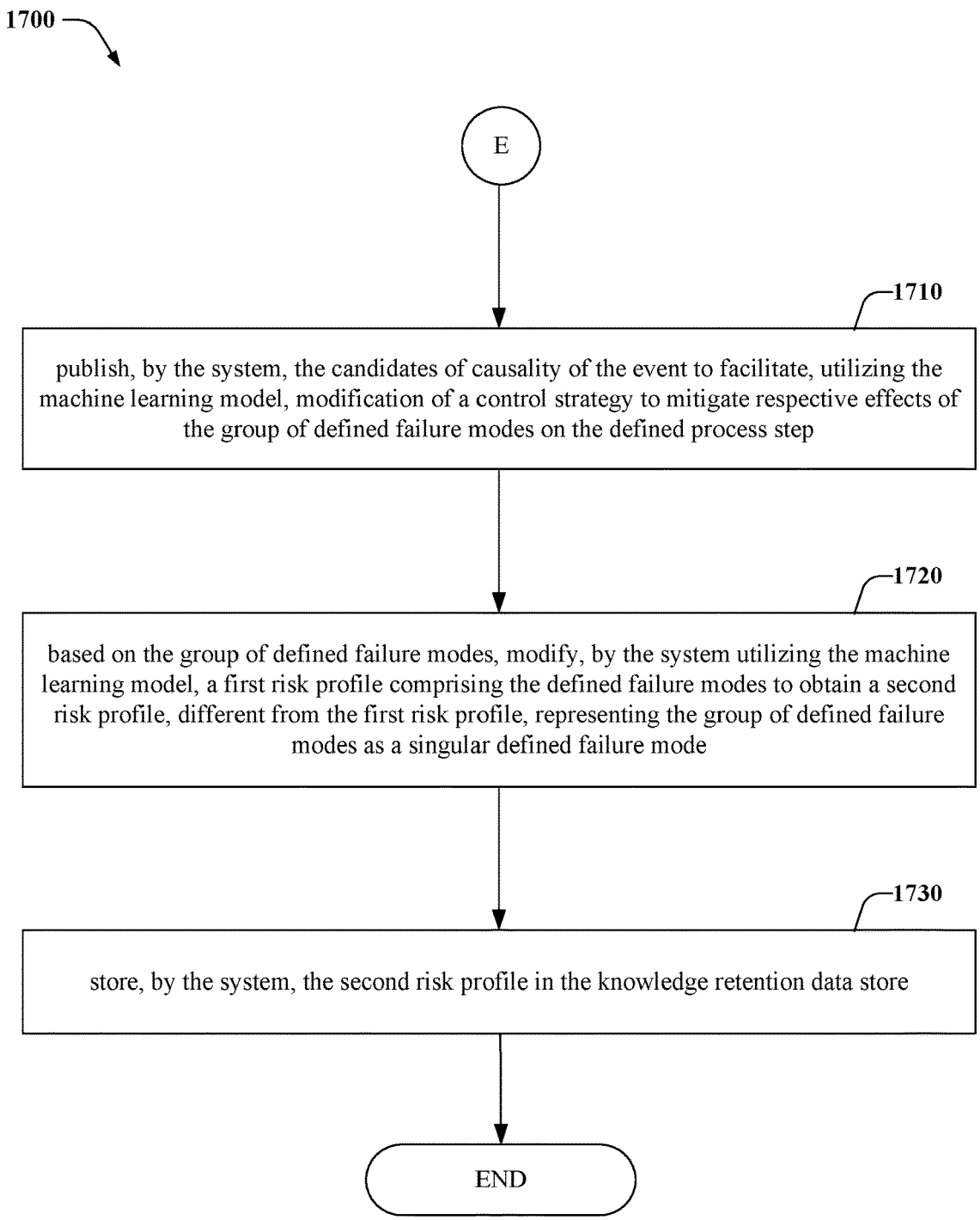

FIGS. 15-17 illustrate another method performed by the system (e.g., 110), that facilitates mitigation of effect(s) of potential multi-variant causes of an adverse event on a defined process of a product lifecycle, in accordance with various example embodiments. At 1510, the system determines a process ontology comprising process steps of a defined process and entities comprising respective attributes that affect respective performances of the process steps during a lifecycle of the defined process.

At 1520, the system associates, utilizing a tracing matrix, a process step of the process steps with respective entities of the entities and with the respective attributes of the entities.

At 1530, the system determines whether an event that represents an output of a performance of the respective performances of a process step of the process steps has been detected. In this regard, in response to the detected event being determined to represent the output of the performance of the process step, flow continues to 1610, at which the system associates, via the tracing matrix, the event with the process step, the respective entities, and the respective attributes of the entities; otherwise flow returns to 1530.

Flow continues from 1610 to 1620, at which the system determines whether the event corresponds to a defined risk profile that has been stored in a knowledge retention data store and that comprises defined failure modes of the defined process step.

In this regard, response to a determination that the event corresponds to the defined risk profile that has been stored in a knowledge retention data store and that comprises the defined failure modes of the defined process step, flow continues to 1630, at which the system selects, utilizing a machine learning model, a group of defined failure modes of the defined failure modes as candidates of causality of the event representing multi-variant causes of the event; otherwise flow returns to 1530.

Flow continues from 1630 to 1710, at which the system publishes the candidates of causality of the event to facilitate, utilizing the machine learning model, modification of a control strategy to mitigate respective effects of the group of defined failure modes on the defined process step.

At 1720, based on the group of defined failure modes, the system modifies, utilizing the machine learning model, a first risk profile comprising the defined failure modes to obtain a second risk profile, different from the first risk profile, representing the group of defined failure modes as a singular defined failure mode. At 1730, the system stores the second risk profile in the knowledge retention data store.

As it is employed in the subject specification, the terms "processor" and "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "memory component", "data store," "data storage device," "database," "storage medium", "tracing matrix", "knowledge retention data store" and substantially any other information storage component relevant to operation and functionality of a component and/or process, refer to memory components, or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in tracing matrix 401, knowledge retention data store 604, non-volatile memory 1822 (see below), disk storage 1824 (see below), and/or memory storage 1846 (see below). Further, nonvolatile memory can be included in read only memory (ROM), programmable ROM (PROM), electrically programmable ROM (EPROM), electrically erasable ROM (EEPROM), or flash memory. Volatile memory 1220 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 18:
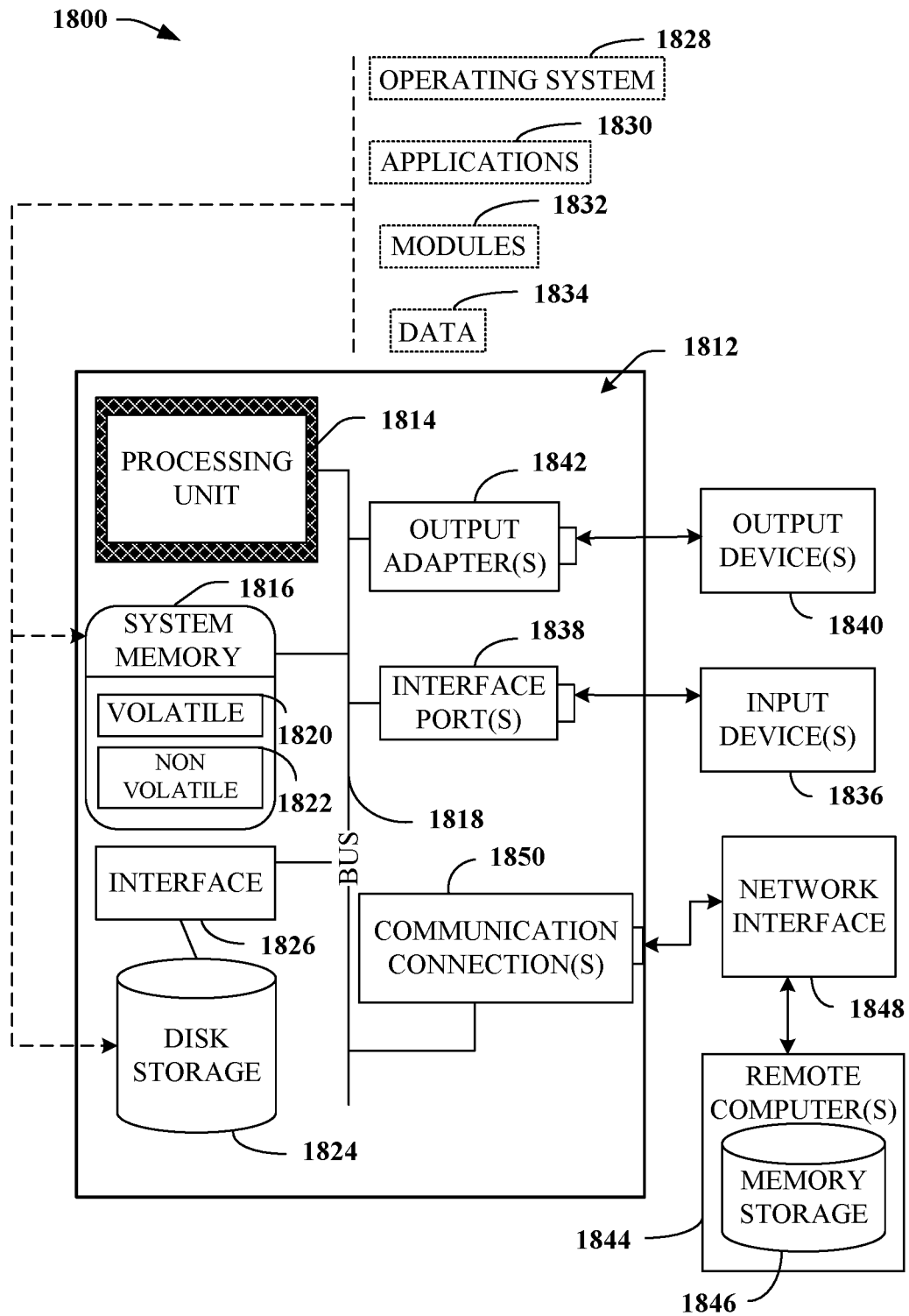
FIG. 18 is a block diagram representing an illustrative non-limiting computing system or operating environment in which one or more aspects of various embodiments described herein can be implemented.

In order to provide a context for the various aspects of the disclosed subject matter, FIG. 18, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 18, a block diagram of a computing system 1800 operable to execute the disclosed systems and methods is illustrated, in accordance with an embodiment. Computer 1812 comprises a processing unit 1814, a system memory 1816, and a system bus 1818. System bus 1818 couples system components comprising, but not limited to, system memory 1816 to processing unit 1814. Processing unit 1814 can be any of various available processors. Dual microprocessors and other multiprocessor architectures also can be employed as processing unit 1814.

System bus 1818 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1816 comprises volatile memory 1820 and nonvolatile memory 1822. A basic input/output system (BIOS), containing routines to transfer information between elements within computer 1812, such as during start-up, can be stored in nonvolatile memory 1822. By way of illustration, and not limitation, nonvolatile memory 1822 can comprise ROM, PROM, EPROM, EEPROM, or flash memory. Volatile memory 1820 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1812 also comprises removable/non-removable, volatile/non-volatile computer storage media. FIG. 18 illustrates, for example, disk storage 1824. Disk storage 1824 comprises, but is not limited to, devices like a magnetic disk drive, floppy disk drive, tape drive, Jaz drive, Zip drive, LS-100 drive, flash memory card, or memory stick. In addition, disk storage 1824 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to system bus 1818, a removable or non-removable interface is typically used, such as interface 1826.

It is to be appreciated that FIG. 18 describes software that acts as an intermediary between users and computer resources described in suitable operating environment 1800. Such software comprises an operating system 1828. Operating system 1828, which can be stored on disk storage 1824, acts to control and allocate resources of computer system 1812. System applications 1830 take advantage of the management of resources by operating system 1828 through program modules 1832 and program data 1834 stored either in system memory 1816 or on disk storage 1824. It is to be appreciated that the disclosed subject matter can be implemented with various operating systems or combinations of operating systems.

A user can enter commands or information into computer 1812 through input device(s) 1836. Input devices 1836 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1814 through system bus 1818 via interface port(s) 1838. Interface port(s) 1838 comprise, for example, a serial port, a parallel port, a game port, a universal serial bus (USB), a wireless based port, e.g., Wi-Fi, Bluetooth, etc. Output device(s) 1840 use some of the same type of ports as input device(s) 1836.

Thus, for example, a USB port can be used to provide input to computer 1812 and to output information from computer 1812 to an output device 1840. Output adapter 1842 is provided to illustrate that there are some output devices 1840, like display devices, light projection devices, monitors, speakers, and printers, among other output devices 1840, which use special adapters. Output adapters 1842 comprise, by way of illustration and not limitation, video and sound devices, cards, etc. that provide means of connection between output device 1840 and system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. Remote computer(s) 1844 can be a personal computer, a server, a router, a network PC, a workstation, a microprocessor based appliance, a peer device, or other common network node and the like, and typically comprises many or all of the elements described relative to computer 1812.

For purposes of brevity, only a memory storage device 1846 is illustrated with remote computer(s) 1844. Remote computer(s) 1844 is logically connected to computer 1812 through a network interface 1848 and then physically and/or wirelessly connected via communication connection 1850. Network interface 1848 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1850 refer(s) to hardware/software employed to connect network interface 1848 to bus 1818. While communication connection 1850 is shown for illustrative clarity inside computer 1812, it can also be external to computer 1812. The hardware/software for connection to network interface 1848 can comprise, for example, internal and external technologies such as modems, comprising regular telephone grade modems, cable modems and DSL modems, wireless modems, ISDN adapters, and Ethernet cards.

The computer 1812 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1812 can connect to other devices/networks by way of antenna, port, network interface adaptor, wireless access point, modem, and/or the like.

The computer 1812 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component", "system", "interface" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

In accordance with various embodiments, processor(s) for implementing embodiments disclosed herein can comprise distributed processing devices, or parallel processing devices, in a single machine, device, etc., or across multiple machines, devices, etc. Furthermore, the processor(s) can comprise a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

In accordance with various aspects of the subject specification, artificial intelligence based systems, components, etc. (e.g., risk based lifecycle management system 110, AI component 240) can employ classifier(s) that are explicitly trained, e.g., via a generic training data, as well as implicitly trained, e.g., by receiving historical information, by receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by risk based lifecycle management system 110, comprising, but not limited to, determining a process ontology comprising process steps of a defined process and respective objects comprising respective attributes that affect respective performances of the process steps during a lifecycle of the defined process; creating a tracing matrix that identifies relationships between a process step of the process steps, the respective objects, and the respective attributes of the objects; detecting an event representing a performance of the respective performances of the process step; correlating, via the tracing matrix, the event with the process step, the respective objects, and the respective attributes of the objects; determining, utilizing a machine learning model, whether the event corresponds to a defined risk profile of a control strategy that has been stored in a knowledge retention data store, in which the defined risk profile represents defined failure modes of the process step; and in response to determining that the event corresponds to the defined risk profile, selecting, via the machine learning model, a portion of the defined failure modes as candidates of causality of the event representing multi-variant causes of the event, and outputting the candidates of causality of the event to facilitate, via the machine learning model, modification of the control strategy to mitigate respective effects of the group of defined failure modes on the process step.

A classifier can be a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to infer an action that a user desires to be automatically performed. In the case of a risk based lifecycle management system disclosed herein, for example, attributes can be information that has been stored via a tracing matrix and/or a knowledge retention data store, and the classes can be categories or areas of interest (e.g., defined failure modes and corresponding RPNs of a defined risk profile). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

For example, the classifier(s) can be used by the artificial intelligence system, e.g., via AI component 240 of risk based lifecycle management system 110, to automatically detect an event representing an output of a performance of a process step; associate, via a tracing matrix, the event with the process step and respective entities and respective attributes of the entities; and in response to determining, utilizing a machine learning model, that the event corresponds to a defined risk profile that has been stored in a knowledge retention data store and that comprises defined failure modes of the defined process step, select, utilizing the machine learning model, a group of defined failure modes of the defined failure modes as candidates of causality of the event representing multi-variant causes of the event.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable components that, when executed by the processor, facilitate performance of operations by the system, the operations comprising:
associating, utilizing a data store, a defined process step of a defined process with
objects comprising respective attributes that affect respective performances of the defined process step during a product lifecycle of the defined process, and
a first defined risk profile version of failure modes of a first defined risk profile that has been stored in the data store, wherein the first defined risk profile version of failure modes represents a first control strategy that facilitates mitigation of respective effects of the first defined risk profile version of failure modes on the defined process step;
in response to an event representing an output of a first performance of the respective performances of the defined process step being detected,
associating, utilizing the data store, the event with the defined process step, the objects, and the first control strategy, and
determining whether a first failure mode of the first defined risk profile and a second failure mode of the first defined risk profile represent potential multi-variant causes of the event, wherein the determining whether the first failure mode and the second failure mode represent the potential multi-variant causes of the event comprises determining, based on a defined relationship between a defined nominal operating range (NOR) of an attribute of the respective attributes corresponding to the first performance of the defined process step and a defined proven acceptable range (PAR) of the attribute, whether there is an interaction between the first failure mode and the second failure mode representing that the first failure mode and the second failure mode function together as the potential multi-variant causes of the event;

in response to the first failure mode and the second failure mode being determined, based on the defined relationship between the defined NOR of the attribute corresponding to the first performance of the defined process step and the defined PAR of the attribute, to function together as the potential multi-variant causes of the event, generating a second defined risk profile version of failure modes representing, via a second defined risk profile that is different from the first defined risk profile, that the first failure mode and the second failure mode function together as the potential multi-variant causes of the event; and in response to determining that an application of the second defined risk profile version of failure modes on the defined process step satisfies a defined risk mitigation condition representing that the effects of the potential multi-variant causes of the event on the defined process have been mitigated, generating a second control strategy that is different from the first control strategy and that is represented by the second defined risk profile version of failure modes, and manufacturing a product by performing, during a second performance of the respective performances of the defined process step utilizing equipment via a product lifecycle management action, the second control strategy on the defined process step, wherein the performing of the second control strategy on the defined process step comprises applying a corrective action on the defined process step comprising modifying, via the equipment, at least one of a granulation of the product, a drying of the product, or a packaging of the product.

2. The system of claim 1, wherein the determining whether the first failure mode and the second failure mode represent the potential multi-variant causes of the event is a first determining, and wherein the operations further comprise:

second determining whether the first failure mode and the second failure mode represent the potential multi-variant causes of the event based on a determined change in a slope of a line connecting respective values of risk priority numbers corresponding to the first defined risk profile version of failure modes of the first defined risk profile.

3. The system of claim 2, wherein the second determining further comprises:

second determining that the first failure mode and the second failure mode represent the potential multi-variant causes of the event in response to the respective values of risk priority numbers being determined to be greater than a defined risk priority number value corresponding to the determined change in the slope of the line connecting the respective values of risk priority numbers.

4. The system of claim 1, wherein the defined NOR and the defined PAR have been defined by a specification that has defined the defined process step.

5. The system of claim 4, wherein the operations further comprise:

in response to the attribute being determined to be outside of the defined NOR, third determining that the first failure mode is a potential multi-variant cause of the potential multi-variant causes of the event.

6. The system of claim 5, wherein the third determining further comprises:

in response to the attribute being determined to be within the defined PAR, third determining that the first failure mode is the potential multi-variant cause of the event.

7. The system of claim 6, wherein the defined NOR is a first defined NOR, wherein the attribute is a first attribute, wherein the potential multi-variant cause is a first potential multi-variant cause, and wherein the operations further comprise:

in response to a second attribute corresponding to the second failure mode being determined to be outside of a second defined NOR of the second attribute, fourth determining that the second failure mode is a second potential multi-variant cause of the event, wherein the second defined NOR has been defined by the specification that has defined the defined process step.

8. The system of claim 1, wherein the defined process utilizes a group of entities that facilitate a process performance of the defined process, and wherein the group of entities comprises at least one of equipment suppliers of the equipment, material suppliers of materials comprising the objects, or the objects.

9. The system of claim 8, wherein the process step corresponds to ordering of the equipment or the materials, shipping of the equipment or the materials, or manufacturing of the equipment or the materials.

10. The system of claim 1, wherein the operations further comprise:

in response to the second control strategy being generated, associating, via the data store, the first defined risk profile version with the second defined risk profile version, and storing the second control strategy in the data store.

11. The system of claim 10, wherein the operations further comprise:

modifying, based on the second defined risk profile version, a defined specification representing the second defined control strategy, and storing the defined specification in the data store.

12. The system of claim 1, wherein the product lifecycle management action is a first product lifecycle management action, wherein the defined process has been performed at different locations, wherein the defined process step has been performed at a first location of the different locations, and wherein the operations further comprise:

in response to a first application, at the first location, of the second control strategy to the defined process step being determined to satisfy the defined risk mitigation condition, and further in response to a second application, at a second location of the different locations, of the second control strategy to the defined process step satisfies the defined risk mitigation condition, applying, via a second product lifecycle management action, the second control strategy on the defined process step at the second location.

13. The system of claim 1, wherein the product is a first product, wherein the equipment is first equipment, wherein the defined process is a first defined process, wherein the defined process step is a first defined process step, wherein the product lifecycle management action is a first product lifecycle management action, and wherein the operations further comprise:

in response to the second control strategy being generated, applying, via a second product lifecycle management action, the second control strategy on a second defined process step of a second defined process.

14. The system of claim 1, wherein the operations further comprise:
publishing, via the data store, a genealogy of the first control strategy and the second control strategy, wherein the genealogy represents differences between the first control strategy and the second control strategy.

15. A method, comprising:
determining, by a system comprising at least one processor, a process ontology comprising process steps of a defined process and entities comprising respective attributes that affect respective performances of the process steps during a lifecycle of the defined process;
associating, by the system utilizing a group of data stores, a process step of the process steps with respective entities of the entities, the respective attributes of the entities, and a first defined risk profile version of failure modes of a first defined risk profile that has been stored in the group of data stores, wherein the first defined risk profile version of failure modes represents a first control strategy that facilitates mitigation of respective effects of the first defined risk profile version of failure modes on the process step;
in response to detecting an event representing an output of a first performance, of the respective performances, of the process step, associating, by the system via the group of data stores, the event with the process step, the respective entities, the respective attributes of the entities, and the first control strategy;
in response to determining, based on a defined relationship between a defined nominal operating range (NOR) of an attribute of the respective attributes corresponding to the first performance of the process step and a defined proven acceptable range (PAR) of the attribute, that there is an interaction between a first failure mode of the first defined risk profile and a second failure mode of the first defined risk profile representing that the first failure mode and the second failure mode function together as potential multi-variant causes of the event, generating a second defined risk profile version of failure modes representing, via a second defined risk profile that is different from the first defined risk profile, that the first failure mode and the second failure mode function together as the potential multi-variant causes of the event; and
in response to determining that an application of the second defined risk profile version of failure modes on the process step satisfies a defined risk mitigation condition representing that the effects of the potential multi-variant causes of the event on the defined process have been mitigated,
generating a second control strategy that is different from the first control strategy and that is represented by the second defined risk profile version of failure modes, and producing a product by performing, during a second performance of the respective performances of the process step utilizing equipment via a product lifecycle management action, the second control strategy on the process step, wherein the performing of the second control strategy on the process step comprises at least one of
modifying a granulation process of the product,
modifying a packaging process of the product, or
modifying a drying process of the product.

16. The method of claim 15, wherein the interaction is a first interaction, and wherein the method further comprises: based on a change in a slope of a line connecting respective risk priority numbers that have been assigned to a group of defined failure modes of the first defined risk profile, determining that there is a second interaction between the first failure mode and the second failure mode representing that the first failure mode and the second failure mode function together as the potential multi-variant causes of the event.

17. The method of claim 15, wherein the generating of the second control strategy further comprises:
based on the group of defined failure modes, modifying the first defined risk profile to obtain the second defined risk profile, wherein the second defined risk profile represents the group of defined failure modes as a singular defined failure mode; and
storing, by the system, the second defined risk profile in the group of data stores.

18. The method of claim 17, further comprising:
in response to the modifying of the first defined risk profile, modifying, by the system based on the second defined risk profile, a defined specification representing the second control strategy, wherein the defined specification has been stored in the group of data stores.

19. A non-transitory machine-readable medium, comprising executable instructions that, when executed by a processor, facilitate performance of operations, comprising:
in response to determining a process ontology comprising process steps of a defined process and respective objects comprising respective attributes that affect respective performances of the process steps during respective process lifecycles of the defined process, creating a tracing matrix that identifies relationships between a process step of the process steps, the respective objects, and the respective attributes of the objects;
detecting an event representing a first performance of the respective performances of the process step corresponding to a first process lifecycle of the respective process lifecycles;
correlating, via the tracing matrix, the event with the process step, the respective objects, and the respective attributes of the objects;
determining whether the event corresponds to a first defined risk profile of a first control strategy that has been stored in a knowledge retention data store, wherein the first defined risk profile represents defined failure modes of the process step, and wherein the first control strategy facilitates mitigation of respective effects of the defined failure modes on the process step;
in response to determining that the event corresponds to the first defined risk profile, and further in response to determining, based on a defined relationship between a defined nominal operating range (NOR) of an attribute of the respective attributes corresponding to the first performance of the process step and a defined proven acceptable range (PAR) of the attribute, that there is an interaction between a first failure mode of the first defined risk profile and a second failure mode of the first defined risk profile representing that the first failure mode and the second failure mode function together as potential multi-variant causes of the event, generating second defined risk profile that is different from the first defined risk profile and that represents that the first failure mode and the second failure mode function together as the potential multi-variant causes of the event; and
in response to determining that an application of the second defined risk profile on the process step satisfies a defined risk mitigation condition representing that the respective effects of the defined failure modes on process step have been mitigated, generating a second control strategy that is different from the first control strategy and that is represented by the second defined risk profile, and producing a product by performing, during a second performance of the respective performances of the process step utilizing equipment via a product lifecycle management action, the second control strategy on the process step, wherein the performing of the second control strategy on the process step comprises modifying, via the equipment, at least one of a granulation process of the product, a packaging process of the product, or a drying process of the product.

20. The non-transitory machine-readable medium of claim 19, wherein the interaction is a first interaction, and wherein the operations further comprise:

in response to respective risk priority numbers that have been assigned to the defined failure modes being determined to satisfy a defined condition corresponding to a determined change in a slope of a line connecting the respective risk priority numbers, determining that there is a second interaction between the first failure mode and the second failure mode representing that the first failure mode and the second failure mode function together as the potential multi-variant causes of the event.

* * * * *